United States Patent
Kayathwal et al.

(10) Patent No.: US 12,536,542 B2
(45) Date of Patent: Jan. 27, 2026

(54) METHODS AND SYSTEMS FOR EVALUATING VULNERABILITY RISKS OF ISSUER AUTHORIZATION SYSTEM

(71) Applicant: MASTERCARD INTERNATIONAL INCORPORATED, Purchase, NY (US)

(72) Inventors: Kanishka Kayathwal, Kota (IN); Gaurav Dhama, Gurgaon (IN); Hardik Wadhwa, Sirsa (IN); Shreyansh Singh, Noida (IN); Siddharth Vimal, Chandigarh (IN); Abhishek Garg, Narwana (IN); Ankur Arora, New Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 142 days.

(21) Appl. No.: 18/145,594

(22) Filed: Dec. 22, 2022

(65) Prior Publication Data

US 2023/0206241 A1    Jun. 29, 2023

(30) Foreign Application Priority Data

Dec. 23, 2021    (IN) .............................. 202141060395

(51) Int. Cl.
   *G06Q 20/40*    (2012.01)
   *G06Q 20/06*    (2012.01)

(52) U.S. Cl.
   CPC ....... *G06Q 20/4016* (2013.01); *G06Q 20/065* (2013.01)

(58) Field of Classification Search
   None
   See application file for complete search history.

(56) References Cited

U.S. PATENT DOCUMENTS 11,100,506 B2 *  8/2021  Zoldi ...................... G06N 3/045
11,206,280 B2 * 12/2021  Dada ........................ H04L 9/50
(Continued)

FOREIGN PATENT DOCUMENTS

| CN | 111985924 A | | 11/2020 | |
|---|---|---|---|---|
| JP | 11100506 A | * | 4/1999 | ............... G06K 9/03 |
| JP | 2021093161 A | * | 6/2021 | ............. G06K 9/623 |

OTHER PUBLICATIONS

Gabriel R. Machado et al. "Adversarial Machine Learning in Image Classification: A Survey Towards the Defender's Perspective." (Sep. 8, 2020). Retrieved online Aug. 15, 2024. https://arxiv.org/pdf/2009.03728 (Year: 2020).*

(Continued)

*Primary Examiner* — James A Reagan
(74) *Attorney, Agent, or Firm* — Jordan IP Law, LLC

(57) ABSTRACT

Embodiments provide artificial intelligence methods and systems for evaluating vulnerability risks of issuer authorization system. Method performed by a server system includes accessing a set of payment transaction data including subset of fraudulent transaction data. Method includes generating via a machine learning model, set of synthetic transaction data based on the subset of fraudulent transaction data. Method includes accessing set of historical card velocity features and collating the set of synthetic transaction data and the set of historical card velocity features to generate set of enriched synthetic transaction data. Method includes extracting via a classifier, subset of feasible fraudulent transaction data from the set of enriched synthetic transaction data. Method includes generating simulated authorization model based on the set of payment transaction data. Method includes classifying via simulated authorization model, each enriched synthetic transaction from the subset (Continued)

of feasible fraudulent transaction data as one of fraudulent transaction and non-fraudulent transaction.

20 Claims, 12 Drawing Sheets

(56) References Cited

U.S. PATENT DOCUMENTS

| | | | | |
|---|---|---|---|---|
| 11,361,076 | B2* | 6/2022 | Nilangekar | G06N 20/00 |
| 11,574,252 | B2* | 2/2023 | Calvano | G06F 21/562 |
| 11,620,389 | B2* | 4/2023 | Karabatis | G06F 18/24 |
| | | | | 726/25 |
| 11,954,174 | B2* | 4/2024 | Pati | G06V 10/774 |
| 2018/0276710 | A1* | 9/2018 | Tietzen | G06Q 30/0269 |
| 2019/0205773 | A1* | 7/2019 | Ackerman | H10N 50/10 |
| 2019/0220755 | A1* | 7/2019 | Carbune | G06N 20/00 |
| 2019/0370473 | A1* | 12/2019 | Matrosov | G06N 3/044 |
| 2020/0065813 | A1* | 2/2020 | Walters | G06N 3/08 |
| 2020/0067965 | A1* | 2/2020 | Dada | H04L 63/1433 |
| 2020/0134179 | A1* | 4/2020 | Nilangekar | G06F 21/552 |
| 2020/0210808 | A1* | 7/2020 | Dong | G06N 3/084 |
| 2020/0401702 | A1* | 12/2020 | Karabatis | G06F 8/75 |
| 2020/0410001 | A1* | 12/2020 | Sarkissian | G06F 3/0482 |
| 2021/0049418 | A1* | 2/2021 | Zhao | G06N 3/047 |
| 2021/0103926 | A1* | 4/2021 | Wu | G06N 20/00 |
| 2021/0166122 | A1* | 6/2021 | Wu | G06N 3/045 |
| 2021/0256426 | A1* | 8/2021 | Calvano | G06N 20/10 |
| 2021/0374756 | A1* | 12/2021 | Pandey | G06N 3/08 |
| 2022/0108133 | A1* | 4/2022 | Pati | G06N 3/045 |
| 2022/0300976 | A1* | 9/2022 | Bhatt | G06Q 20/4016 |
| 2023/0118240 | A1* | 4/2023 | Wong | G06N 3/045 |
| | | | | 705/44 |
| 2023/0142664 | A1* | 5/2023 | Ackerman | G06F 30/20 |
| | | | | 706/50 |

OTHER PUBLICATIONS

Horvath, Izabela et al., "METGAN: Generative Tumour Inpainting and Modality Synthesis in Light Sheet Microscopy" ArXiv:2104.10993v2 [eess.IV], Apr. 23, 2021, 16 pages.

Zhang, Zhaohui et al., "A generative adversarial network-based method for generating negative financial samples" International Journal of Distributed Sensor Networks 16(2): Feb. 14, 2020, 12 pages.

Iwang, Jeonghyun et al., "An Efficient Domain-Adaptation Method using GAN for Fraud Detection" International Journal of Advanced Computer Science and Applications vol. 11, No. 11, Jan. 2020, pp. 94-103.

Fursov, Ivan et al., "Adversarial Attacks on Deep Models for Financial Transaction Records" arXiv:2106.08361v1 [cs.LG] Jun. 15, 2021, 14 pages.

Karlsson, Anton et al., "Synthesis of Tabular Financial Data using Generative Adversarial Networks" Degree Projects in Mathematical Statistics (30 ECTS credits), Master's Programme in Applied and Computational Mathematics, KTH Royal Institute of Technology year 2020, 82 pages.

Wang, Xiaoguo et al., "A Fraudulent Data Simulation Method Based on Generative Adversarial Networks" Journal of Physics: Conference Series 1302 022089, 2019, 9 pages.

* cited by examiner

METHODS AND SYSTEMS FOR EVALUATING VULNERABILITY RISKS OF ISSUER AUTHORIZATION SYSTEM

TECHNICAL FIELD

The present disclosure relates to artificial intelligence and, more particularly to, electronic methods and complex processing systems for determining vulnerability risks (e.g., fraudulent transactions) within an issuer authorization network or system.

BACKGROUND

In the current scenario, conventional techniques that are used to determine vulnerabilities in an issuer authorization network operate by staging the setup of an authorization system by an issuer in an issuer-managed mode and then, evaluating the issuer authorization network on manually curated test cases/transactions for any deviation from expected behavior. Further, a detailed report is generated with insights into identified vulnerabilities and security gaps based on the response of the authorization system to the test cases. The transaction data involves huge amounts of data that need to be processed to be used in the test cases to determine deviation from the expected behavior.

It is understood that tabular data is one of the most common and important data modalities and it generally constitutes an important part of financial data, health records, census records, etc. Training machine learning models on real tabular datasets can often lead to privacy concerns as personal and identifiable information could be inferred from the predictions. On the other hand, there may be a dearth of enough data to train the machine learning models effectively, especially in the case of a high imbalance in the data. In such scenarios, the generation of synthetic tabular data can alleviate these issues. To that end, Generative Adversarial Networks (GANs) have seen their use for generating synthetic data, from unstructured data like images to structured tabular data. Existing GAN models demonstrate state-of-the-art performance on this task even in the presence of a high-class imbalance in categorical columns or multiple modes in continuous columns. However, training these models requires a high memory footprint especially while dealing with high cardinality categorical columns in the dataset. Herein, high cardinality categorical columns refer to columns with numerous unique values or variables.

Therefore, most of the existing methods require issuers to set up their network in a test environment to test the performance of the authorization system and the test cases are manually curated by the tester. Also, the methods to determine the vulnerabilities are missing intelligent test cases and the payment service provider is required to reverse all the test case transactions.

Thus, there exists a technological need for technical solutions for assessing and determining vulnerabilities and security gaps in the issuer authorization systems or frameworks.

SUMMARY

Various embodiments of the present disclosure provide methods and systems for evaluating the vulnerability risks of the issuer authorization system.

In an embodiment, a computer-implemented method for determining vulnerabilities in an authorization model is disclosed. The computer-implemented method performed by a server system includes accessing a set of payment transaction data from a transaction database. The set of payment transaction data includes a subset of fraudulent transaction data and a subset of non-fraudulent transaction data. Further, the method includes generating via a machine learning model, a set of synthetic transaction data based, at least in part, on the subset of fraudulent transaction data. Further, the method includes accessing a set of historical card velocity features from the transaction database. Further, the method includes collating the set of synthetic transaction data and the set of historical card velocity features to generate a set of enriched synthetic transaction data. Further, the method includes extracting via a classifier, a subset of feasible fraudulent transaction data from the set of enriched synthetic transactions. Further, the method includes generating a simulated authorization model based, at least in part, on the set of payment transaction data. The simulated authorization model is a replica of an issuer authorization model associated with an issuer server. Further, the method includes classifying via the simulated authorization model, each enriched synthetic transaction from the subset of feasible fraudulent transaction data as one of fraudulent transaction and non-fraudulent transaction.

In another embodiment, a server system is disclosed. The server system includes a communication interface and a memory including executable instructions. The server system also includes a processor communicably coupled to the memory. The processor is configured to execute the instructions to cause the server system, at least in part, to access a set of payment transaction data from a transaction database. The set of payment transaction data includes a subset of fraudulent transaction data and a subset of non-fraudulent transaction data. The system is further caused to generate via a machine learning model, a set of synthetic transaction data based, at least in part, on the subset of fraudulent transaction data. The server system is further caused to access a set of historical card velocity features from the transaction database. The server system is further caused to collate the set of synthetic transaction data and the set of historical card velocity features to generate a set of enriched synthetic transaction data. The server system is further caused to extract via a classifier a subset of feasible fraudulent transaction data from the set of enriched synthetic transaction data. The server system is further caused to generate a simulated authorization model based, at least in part, on the set of payment transaction data. The simulated authorization model is a replica of an issuer authorization model associated with an issuer server. The server system is further caused to classify via the simulated authorization model, each enriched synthetic transaction from the subset of feasible fraudulent transaction data as one of fraudulent transaction and non-fraudulent transaction.

In yet another embodiment, a non-transitory computer-readable storage medium is disclosed. The non-transitory computer-readable storage medium includes computer-executable instructions that, when executed by at least a processor of a server system, cause the server system to perform a method. The method includes accessing a set of payment transaction data from a transaction database. The set of payment transaction data includes a subset of fraudulent transaction data and a subset of non-fraudulent transaction data. Further, the method includes generating via a machine learning model, a set of synthetic transaction data based, at least in part, on the subset of fraudulent transaction data. Further, the method includes accessing a set of historical card velocity features from the transaction database.

Further, the method includes collating the set of synthetic transaction data and the set of historical card velocity features to generate a set of enriched synthetic transaction data. Further, the method includes extracting via a classifier, a subset of feasible fraudulent transaction data from the set of enriched synthetic transactions. Further, the method includes generating a simulated authorization model based, at least in part, on the set of payment transaction data. The simulated authorization model is a replica of an issuer authorization model associated with an issuer server. Further, the method includes classifying via the simulated authorization model, each enriched synthetic transaction from the subset of feasible fraudulent transaction data as one of fraudulent transaction and non-fraudulent transaction.

BRIEF DESCRIPTION OF THE FIGURES

For a more complete understanding of example embodiments of the present technology, reference is now made to the following descriptions taken in connection with the accompanying drawings in which.

Figure 1:
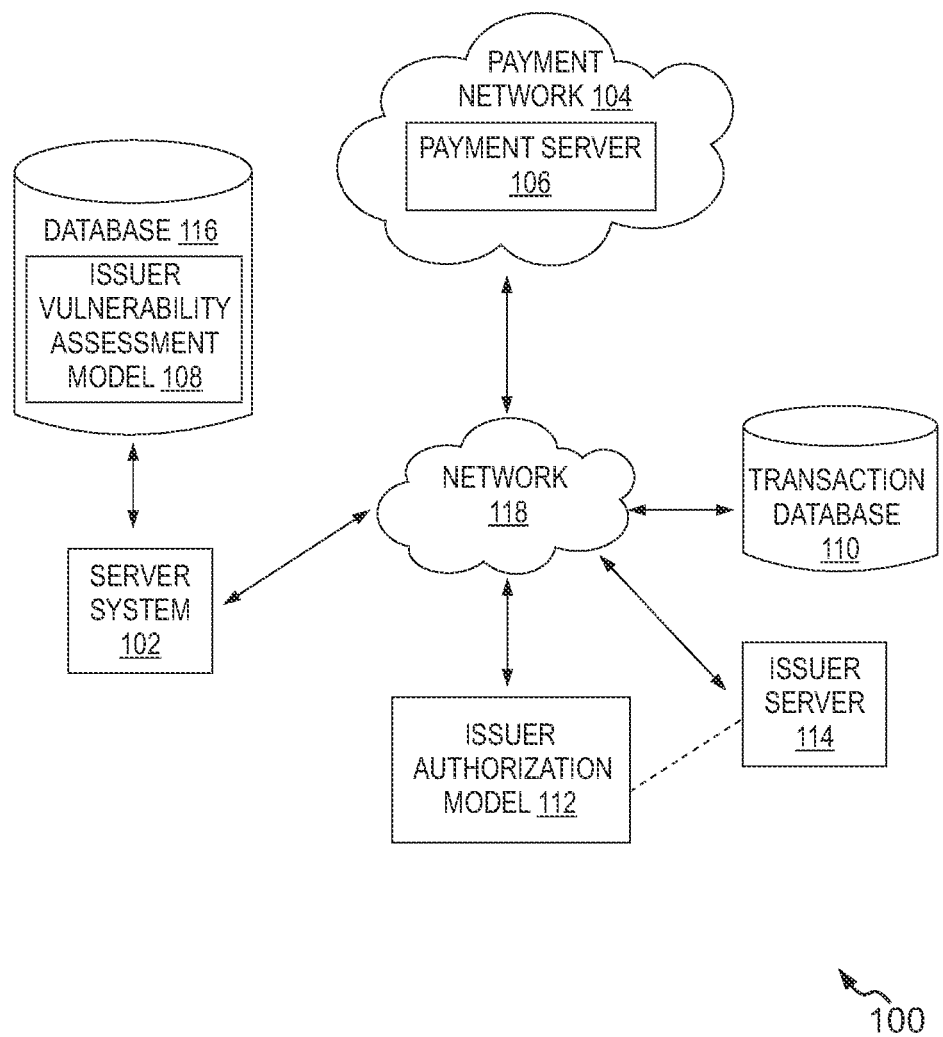
FIG. 1 illustrates an exemplary representation of an environment related to at least some embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all refer to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "issuer", used throughout the description, refers to a financial institution normally called an "issuer bank" or "issuing bank" in which an individual or an institution may have an account. The issuer may issue a payment card, such as a credit card, a debit card, etc., to an account holder. Further, the issuer may also facilitate online banking services such as electronic money transfer, bill payment, etc., to the account holders through a server system called "issuer server" throughout the description.

The term "payment network", used herein, refers to a network or collection of systems used for the transfer of funds through the use of cash substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes that may include payment cards, letters of credit, checks, financial accounts, etc. Examples of networks or systems configured to perform as payment networks include those operated by such as Mastercard®.

The term "merchant", used throughout the description generally refers to a seller, a retailer, a purchase location, an organization, or any other cardholder that is in the business of selling goods or providing services, and it can refer to either a single business location or a chain of business locations of the same cardholder.

The terms "cardholder" and "customer" are used interchangeably throughout the description and refer to a person who holds a credit card or a debit card that may be used by a merchant to perform a card-not-present (CNP) payment transaction.

The term "artificial intelligence model", used throughout the description, may refer to an application of artificial intelligence that provides systems with the ability to automatically learn and improve from experience without explicitly being programmed. An artificial intelligence model may include a set of software routines and parameters that can predict an output of a process (e.g., identification of fraudulent transactions, authentication of a cardholder, a suitable recommendation based on a user search query, etc.) based on a "feature vector" or other input data. A structure of the software routines (e.g., number of subroutines and the relation between them) and/or the values of the parameters can be determined in a training process, which can use actual results of the process that is being modeled (e.g., the identification of different classes of input data). Examples of artificial intelligence models include machine learning models, such as support vector machines (SVMs), models that classify data by establishing a gap or boundary between inputs of different classifications, as well as neural networks, which are collections of artificial "neurons" that perform functions by activating in response to inputs. In some embodiments, a neural network can include a convolutional neural network (CNN), a recurrent neural network (RNN), machine learning models, etc., among other suitable models.

The term "tabular dataset", used throughout the description, can include a collection of related sets of information that can be composed of different elements represented in tabular form but can be manipulated as a unit by a computer. In some embodiments, a dataset can include a plurality of feature vectors. For example, in some embodiments, the dataset can include publicly available datasets for credit card fraud detection systems.

Conventionally, each issuer has its transaction authorization model (which may also be called an 'issuer authorization model') based on which the payment transactions are authorized or declined. Sometimes, the transaction authorization model may be compromised by a fraudster using targeted adversarial examples and then, use the compromised transaction authorization model to engage in criminal activities. Therefore, there is a need to assess vulnerability risks associated with the pre-deployed transaction authorization model.

Uniquely, the systems and methods herein enable payment account issuers, to evaluate the pre-deployed transaction authorization model based on various vulnerability risks. In particular, for example, the system may solicit transaction data from the transaction database, create a plurality of synthetic transaction samples based on specialized GAN models (known as memory-efficient conditional GAN model), simulate the transaction authorization model, and calculate a vulnerability risk score of the simulated transaction authorization model by utilizing the synthetic transaction samples as adversarial examples on the simulated transaction authorization model, and then decide, based on comparing the vulnerability risk score to one or more defined thresholds, whether the simulated transaction authorization model is vulnerable or not. It is understood that any vulnerability associated with the simulated transaction authorization model will also be applicable to the pre-deployed transaction authorization model. In this manner, scrutiny of pre-deployed transaction authorization models is enhanced, thereby improving the trustworthiness of the issuer's transaction authorization models.

Various example embodiments of the present disclosure provide methods, systems, user devices, and computer program products for building robust artificial intelligence-based issuer vulnerability assessment models using a memory-efficient conditional generative adversarial network (MeTGAN) architecture. More specifically, techniques disclosed herein disclose generating synthetic fraudulent transaction data and using this generated synthetic fraudulent transaction data to determine if the issuer authorization system is vulnerable or not.

OVERVIEW

Various example embodiments of the present disclosure provide artificial intelligence methods, systems, user devices, and computer program products for issuer vulnerability assessment. More specifically, techniques disclosed herein enable an issuer authorization system to reject authorization of fraudulent or high risky transactions. It is noted that the various techniques disclosed by the present disclosure are applicable for acquirer vulnerability assessment as well, thereby allowing an acquirer to check for vulnerabilities in its authorization models as well.

Nowadays, fraudsters are getting away with fraudulent transactions which are unknowingly approved by the issuer authorization system. The fraudsters are exploiting the vulnerabilities or loopholes in the issuer authorization network to get approval for such fraudulent transactions. Therefore, there exists a need to address these vulnerabilities in the existing/pre-deployed issuer authorization models.

To overcome such problems or limitations, the present disclosure describes a server system that is configured to automate the process of creating unique test cases using a MeTGAN model and testing a simulated issuer authorization model to determine various vulnerabilities associated with the existing issuer authorization model. In one embodiment, the server system is one of an issuer server and a payment server in a payment network.

In one embodiment, a server system is configured to access a set of payment transaction data from a transaction database. The set of payment transaction data includes a subset of fraudulent transaction data and a subset of non-fraudulent transaction data. The system is further configured to generate via a machine learning model, a set of synthetic transaction data based, at least in part, on the subset of fraudulent transaction data. In an example, the machine learning model is a memory-efficient conditional generative adversarial network. (MeTGAN).

In an embodiment, the server system is further configured to access a set of historical card velocity features from the transaction database. In an example, the set of historical card velocity features includes information related to a number of transactions performed using the card over a given period of time, a number of times the card was used at a particular merchant, an average card spend, a transaction amount for each card.

In an embodiment, the server system is further configured to collate the set of synthetic transaction data and the set of historical card velocity features to generate a set of enriched synthetic transaction data. The server system is further configured to extract via a classifier a subset of feasible fraudulent transaction data from the set of enriched synthetic transaction data.

In an alternative embodiment, the server system is configured to generate a set of adversarial data based, at least in part, on the set of payment transaction data. In an example, the set of adversarial data is generated by attacking the simulated authorization model using a black-box attack. The set of adversarial data indicates negative perturbations in the set of payment transaction data. In another example, the black-box attack is at least one of Zeroth-order optimization, HopskipJump, Boundary attack, and GenAttack. Further, the server system is configured to collate the set of synthetic transaction data and the set of adversarial data to generate a set of new synthetic transaction data. Further, the server system is configured to access the set of historical card velocity features from the transaction database. Further, the server system is configured to collate the set of new synthetic transaction data and the set of historical card velocity features to generate a set of new enriched synthetic transaction data. Further, the server system is configured to extract via the classifier, a subset of new feasible fraudulent transaction data from the set of new enriched synthetic transaction data.

In an embodiment, the server system is further configured to generate a simulated authorization model based, at least in part, on the set of payment transaction data. The simulated authorization model is a replica of an issuer authorization model associated with an issuer server. In an embodiment, the server system is further configured to classify via the simulated authorization model, each enriched synthetic transaction from the subset of feasible fraudulent transaction data as one of fraudulent transaction and non-fraudulent transaction. In an alternative embodiment, the server system is further configured to classify via the simulated authorization model, each new enriched synthetic transaction from the subset of new feasible fraudulent transaction data as one of fraudulent transaction and non-fraudulent transaction.

In an example, the classifier is at least one of a perceptron-based classifier, a Naive Bayes classifier, a Decision Tree-based classifier, a Logistic Regression based classifier, a K-Nearest Neighbor classifier, an Artificial Neural Networks/Deep Learning-based classifier, or a Support Vector Machine (SVM).

In an embodiment, the server system is further configured to generate a vulnerability report based, at least in part, on determining if one or more enriched synthetic transactions from one of the subset of feasible fraudulent transaction data and the subset of new feasible fraudulent transaction data is classified as a non-fraudulent transaction. The vulnerability report indicates one or more vulnerabilities in the simulated authorization model.

Various embodiments of the present disclosure offer multiple technical advantages and technical effects. For instance, the present disclosure eradicates the need to set up the issuer network in a test environment by using the simulated authorization model, thereby eliminating any network downtime during the testing process. Further, the use of automated and intelligent test cases eliminates the need for manual testing, thereby enabling faster vulnerability assessment for the issuer authorization model while saving time and resources. Further, the present disclosure provides a detailed vulnerability report with insights into identified vulnerabilities and security gaps based on the response of the simulated authorization model to various test cases. This vulnerability report can be used by the issuer to modify the existing issuer authorization model and eliminate the identified vulnerabilities. Further, the techniques of the present disclosure can be extended to all entities within the payment network such as an acquirer server associated with an acquirer of any merchant, a payment server associated with the payment network, and the like with minor modifications. Further, the present disclosure enables the payment network to detect new fraudulent behaviors.

Various example embodiments of the present disclosure are described hereinafter with reference to FIGS. 1 to 10.

FIG. 1 illustrates an exemplary representation of an environment 100 related to at least some embodiments of the present disclosure. Although the environment 100 is presented in one arrangement, other embodiments may include the parts of the environment 100 (or other parts) arranged otherwise depending on, for example, generating synthetic transaction data to assess the vulnerability of issuer authorization models. The environment 100 generally includes a server system 102, a payment network 104 including a payment server 106, a transaction database 110, an issuer authorization model 112 associated with an issuer server 114, each coupled to, and in communication with (and/or with access to) a network 118. The network 118 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among two or more of the parts illustrated in FIG. 1, or any combination thereof Various entities in the environment 100 may connect to the network 118 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, future communication protocols or any combination thereof. For example, the network 118 may include multiple different networks, such as a private network made accessible by the server system 102 and a public network (e.g., the Internet, etc.) through which the server system 102, the payment server 106, an issuer vulnerability assessment model 108 and the issuer server 114 may communicate.

In one embodiment, the server system 102 is configured to perform one or more operations described herein. In one example, the server system 102 coupled with a database 116. In another example, the server system 102 can be embodied in the payment server 106 of the payment network 104. In yet another example, the server system 102 can be embodied in the issuer server 114. In general, the server system 102 is configured to generate synthetic transaction data (i.e., fraudulent transaction data) and further input the synthetic transaction data into an instance of the issuer authorization model 112 to determine vulnerabilities or security gaps in the issuer authorization model 112. It is noted that the server system 102 executes a specialized GAN model, i.e., MeT-GAN model to generate the synthetic transaction data which also enriches the synthetic transaction data by adding adversarial examples/sample/data and/or card velocity features to the synthetic transaction data.

The server system 102 is a separate part of the environment 100, and may operate apart from (but still in communication with, for example, via the network 118) the payment server 106, issuer server 114, and any third-party external servers (to access data to perform the various operations described herein). However, in other embodiments, the server system 102 may actually be incorporated, in whole or in part, into one or more parts of the environment 100, for example, the payment server 106. In addition, the server system 102 should be understood to be embodied in at least one computing device in communication with the network 118, which may be specifically configured, via executable instructions, to perform steps as described herein, and/or embodied in at least one non-transitory computer-readable media. In one embodiment, the database 116 stores the issuer vulnerability assessment model 108. The database 116 is configured to store instructions for evaluating the issuer authorization model 112 through the network 118.

The issuer vulnerability assessment model 108 is an artificial intelligence-based model configured to generate the set of synthetic transaction data from a set of payment transaction data. In one example, the transaction database 110 stores the set of payment transaction data. In one embodiment, the issuer vulnerability assessment model 108 generates the set of synthetic transaction data using a memory-efficient conditional generative adversarial network (MeTGAN) architecture (explained later in reference to FIG. 4) and determines the vulnerabilities or security gaps in the issuer authorization model 112 of the issuer authorization network. Further, the issuer vulnerability assessment model 108 is explained later in reference to FIG. 5.

In one embodiment, the transaction database 110 is a central repository of data that is created by storing payment transaction data from transactions occurring within acquirers and issuers associated with the payment network 104. In one embodiment, the transaction database 110 may store real-time payment transaction data including fraudulent payment transaction data and non-fraudulent payment transaction data associated with various payment transactions performed between one or more cardholders and one or more merchants. The payment transaction data may include payment transaction features, such as transaction identifier, merchant name, merchant identifier, merchant category code (MCC), cross-border transaction flag, payment card type (debit/credit/prepaid), card product type, transaction channel (e.g., e-commerce, recurring, etc.), card-not-present (CNP) transaction flag, response code flag (approve/decline), decline reason code (in case of the declined transaction), and the like. In one embodiment, the transaction database 110 may store the transaction data in a tabular form.

In one embodiment, the issuer server 114 is a financial institution that manages the accounts of multiple cardholders. Account details of the accounts established with the issuer bank are stored in the permanent account number (PAN) profiles of the cardholders in the memory of the issuer server 114 or on a cloud server associated with the issuer server 114. The terms "issuer server", "issuer", or "issuing bank" will be used interchangeably herein.

In one embodiment, the issuer authorization model 112 is a transaction authorization model used by the issuer server 114 to classify payment transactions as fraudulent or non-fraudulent transactions. In one example, the issuer authorization model 112 is a part of the authorization network associated with the issuer server 114. Further, the issuer authorization model 112 is configured to detect fraudulent payment transactions in real-time. The issuer authorization model 112 performs the process of approving or declining the payment transactions as performed by the issuer payment authorization system for a given set of transactions. In one example, the issuer authorization system may approve non-fraudulent transactions and decline fraudulent transactions. In one example, the issuer authorization system may approve or decline payment transactions based on a set of rules or protocols established by the issuer 114. It is noted that the issuer authorization model 112 is an Artificial Intelligence (AI) model and/or a Machine Learning (ML) model that is trained and operated by the issuer 114.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device is shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
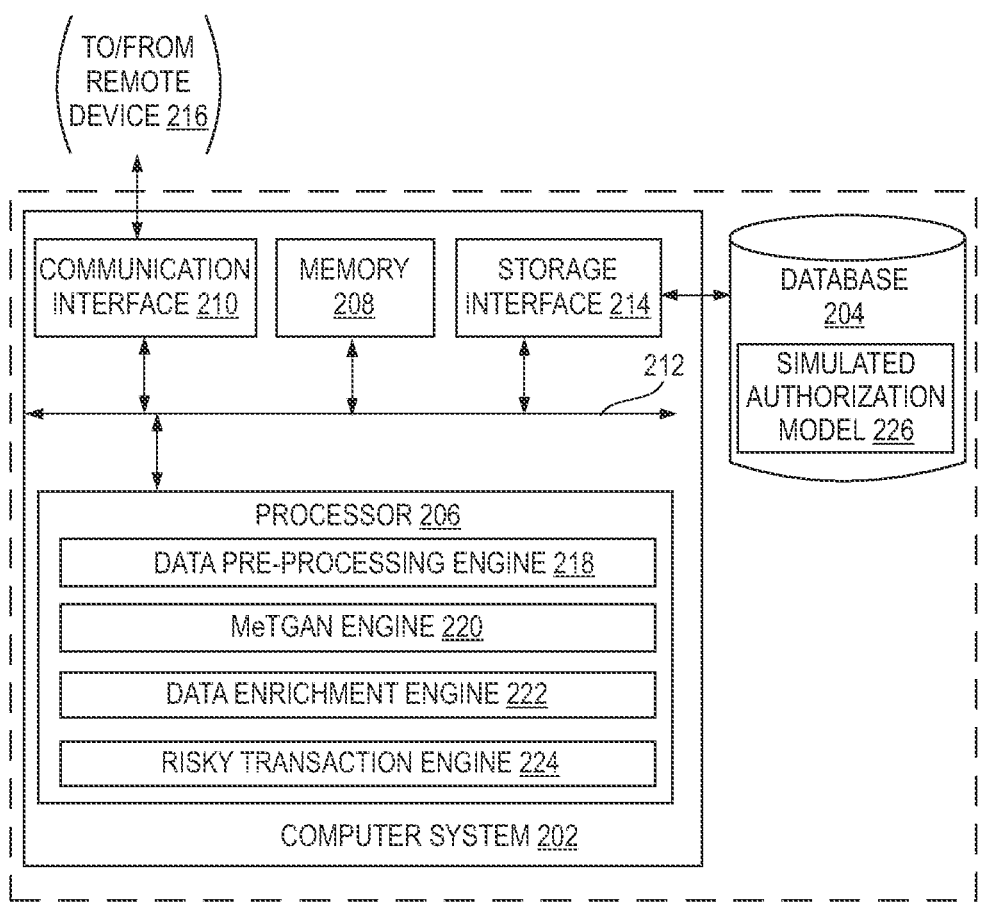
FIG. 2 is a simplified block diagram of a server system, in accordance with an embodiment of the present disclosure.

FIG. 2 is a simplified block diagram of a server system 200, in accordance with an embodiment of the present disclosure. The server system 200 is similar to the server system 102 of FIG. 1. In some embodiments, the server system 200 is embodied as a cloud-based and/or SaaS-based (software as a service) architecture. In one embodiment, the server system 200 is a part of the payment network 104. The server system 200 includes a computer system 202 and a database 204. The computer system 202 includes at least one processor 206 for executing instructions, a memory 208, a communication interface 210, and a storage interface 214 that communicate with each other via a bus 212.

In some embodiments, the database 204 is integrated within the computer system 202. For example, the computer system 202 may include one or more hard disk drives (or solid-state drives) as the database 204. The storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a redundant array of independent disks (RAID) controller, a storage area network (SAN) adapter, a network adapter, and/or any component providing the processor 206 with access to the database 204. The database 204 is configured to store a simulated authorization model 226.

Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), a solid state drive (SSD), and the like. It will be apparent to a person skilled in the art that the scope of the disclosure is not limited to realizing the memory 208 in the server system 200, as described herein. In another embodiment, the memory 208 may be realized in the form of a database server or cloud storage (not shown) working in conjunction with the server system 200, without departing from the scope of the present disclosure.

The processor 206 is operatively coupled to the communication interface 210 such that the processor 206 is capable of communicating with a remote device 216, such as the issuer server 114. It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one embodiment, the processor 206 includes a data pre-processing engine 218, a memory-efficient conditional generative adversarial network (MeTGAN) engine 220, a data enrichment engine 222, and a risky transaction classifier engine 224. It should be noted that the components, described herein, can be configured in a variety of ways, including electronic circuitries, digital arithmetic and logic blocks, and memory systems in combination with software, firmware, and embedded technologies.

The data pre-processing engine 218 includes suitable logic and/or interfaces for accessing a set of payment transaction data from a database (e.g., the transaction database 110). The set of payment transaction data includes information associated with a set of historical payment transactions. In other words, the data pre-processing engine 218 includes suitable logic and/or interfaces for accessing the set of payment transaction data associated with a plurality of payment transactions performed over the payment network 104. In one embodiment, the set of payment transaction data may be stored in a tabular form. In one example, the set of payment transaction data includes a subset of fraudulent transaction data and a subset of non-fraudulent transaction data associated with one or more cardholders for a particular time window (e.g., 1 year). The set of payment transaction data includes various payment transaction features, such as transaction identifier (ID), merchant name, merchant identifier (ID), merchant category code (MCC), cross-border transaction flag, payment card type (debit/credit/prepaid), card product type, transaction channel (e.g., e-commerce, recurring, etc.), card-not-present (CNP) transaction flag, response code flag (approve/decline), decline reason code (in case of the declined transaction), credit score and the like. In other words, the data pre-processing engine 218 is configured to extract payment transaction features from various data points of the set of payment transaction data. The payment transaction features may include but are not limited to, transaction details, merchant details, and authentication details. The transaction details may further include details regarding, but are not limited to, transaction amount, card on file, recurring payment, cross border indicator, product type, etc. The merchant details may further include details regarding, but are not limited to, merchant country, currency conversion, merchant category code (MCC), etc. The authentication details may further include details regarding, but are not limited to, response code flag (approve/decline), decline reason code (if the transaction is declined), fraud or non-fraud label, etc.

The data pre-processing engine 218 determines a cardholder's spending behaviors and/or payment behaviors based on the various payment transaction features extracted from the set of payment transaction data. Further, the data pre-processing engine 218 is configured to generate a plurality of feature vectors (i.e., a set of feature vectors) based at least on the cardholder spending behaviors/payment behavior, and cardholder credit bureau information (i.e., credit score).

It is noted that a "feature vector" may include a set of measurable properties (or "features") that represent some object or entity. The feature vector can include collections of data represented digitally in an array or vector structure. In one embodiment, the feature vector can also include collections of data that can be represented as a mathematical vector, on which vector operations such as the scalar product can be performed. The feature vector can be determined or generated from input data. The feature vector can be used as the input to a machine learning model, such that the machine learning model produces some output or classification. The construction of a feature vector can be accomplished in a variety of ways, based on the nature of the input data. In one example embodiment, the plurality of feature vectors may be generated based on the payment transaction features corresponding to the set of payment transaction data, such as transaction amount, fraud label, timestamp of the payment transaction, and the like. Further, the feature vector can be normalized, i.e., made to have a unit magnitude. Further, the feature vector ($200, "fraud") corresponding to payment transactions could be normalized to approximately (0.40, 1).

Thus, the data pre-processing engine 218 is configured to form transaction samples based on the payment transaction data.

The MeTGAN engine 220 includes suitable logic and/or interfaces for generating a set of synthetic transaction data. Each of the synthetic transactions within the set of synthetic transaction data is a fraudulent transaction. In an embodiment, the MeTGAN engine 220 generates the set of synthetic transaction data based, at least in part, on an Artificial Intelligence (AI) model or a Machine Learning (ML) model. In an example, the AI or ML model is a feed-forward neural network model such as a memory-efficient conditional generative adversarial network (MeTGAN) model. The MeTGAN model is a form of a conditional generative adversarial network (CTGAN), which can compute large datasets with high cardinality. The MeTGAN engine 220 handles datasets with high cardinality categorical columns with a performance that is on par with the current state-of-the-art algorithms. In an embodiment, the MeTGAN engine 220 is configured to generate the set of synthetic transaction data via the MeTGAN model based at least in part on the subset of fraudulent transaction data included in the set of payment transaction data. It is understood that since the set of synthetic transaction data is generated based on the subset of fraudulent transaction data, all of the synthetic transactions are fraudulent in nature.

The data enrichment engine 222 includes suitable logic and/or interfaces for accessing a set of historical card velocity features from a database such as the transaction database 110. Further, the data enrichment engine 222 is configured to enrich the set of synthetic transaction data by adding or collating the set of historical card velocity features with the set of synthetic transaction data (that consists of fraudulent transaction datasets). In other words, the data enrichment engine 222 concatenates the set of synthetic transaction data with the set of historical card velocity features extracted from the transaction database 110 to generate a set of enriched synthetic transaction data. In various examples, the set of historical card velocity features includes at least information related to a number of payment transactions conducted with the same card over a given period of time, types of payment cards used at merchants, average card spend threshold, amount transacted by a particular payment card, and the like.

The risky transaction classifier engine 224 includes suitable logic and/or interfaces for classifying the set of enriched synthetic transaction data into different categories such as high-risk fraudulent transactions or low-risk fraudulent transactions. It is noted that high-risk fraudulent transactions can be considered a feasible transaction. As may be understood, the synthetic transactions associated with various transaction features and enriched with the set of historical card velocity vectors are not perfect in nature. That is, they might be illogical in nature. For example, transaction features associated with an enriched synthetic transaction feature might indicate that a synthetic transaction is a Card Present (CP) transaction at an e-commerce merchant. However, the same is simply not possible or feasible such e-commerce transactions are always Card-not-present (CNP) transactions. To that end, such unfeasible transactions must be removed from the set of enriched synthetic transaction data or feasible transactions must be extracted from the set of enriched synthetic transaction data.

To that end, the risky transaction classifier engine 224 is configured to extract a subset of feasible fraudulent transaction data from the set of enriched synthetic transaction data. In an embodiment, the risky transaction classifier engine 224 extracts a subset of feasible fraudulent transaction data based, at least in part, on an AI model or an ML model. In an example, the AI or ML model is a neural network based classifier which identifies and extracts the subset of feasible fraudulent transaction data (which correspond to high-risk fraudulent transactions) from the set of enriched synthetic transaction data. It is understood, that since the transactions present in the subset of feasible fraudulent transaction data are high-risk fraudulent transactions, i.e., they are very plausible, therefore, it is ensured that there is a large probability that these generated high-risk fraudulent transactions may not be identified by the issuer authorization model 112 of the issuer server 114. In one embodiment, the risky transaction classifier engine 224 may also be used to classify the set of enriched synthetic transaction data consisting of fraudulent transaction datasets into different types of fraud classes.

In another embodiment, the risky transaction classifier engine 224 is configured to generate a simulated issuer authorization model 226 (referred hereinafter to as 'simulated authorization model 226') based at least in part on the set of payment transaction data. It is noted that the simulated authorization model 226 is a replica of the issuer authorization model 112 of FIG. 1. The simulated authorization model 226 mimics the process of approving or declining the payment transactions as performed by the issuer authorization model 112 for a given set of transactions. In one example, the simulated authorization model 226 may approve the non-fraudulent transactions and decline the fraudulent transactions exactly as the issuer authorization model 112. It is noted that the simulated authorization model 226 is a classifier model that is trained on the transaction features of the various historical payment transactions present in the set of payment transaction data. In particular, previous transaction approval or decline decisions of the issuer authorization model 112 can be used to train the simulated authorization model 226.

In another embodiment, the risky transaction classifier engine 224 is configured to classify, via the simulated authorization model 226, each enriched synthetic transaction from the subset of feasible fraudulent transaction data as one of fraudulent transaction and non-fraudulent transaction. Based on this classification, the risky transaction classifier engine 224 is further configured to generate a vulnerability report for issuer server 114. In other words, a vulnerability report is generated by the risky transaction classifier engine 224 based, at least in part, on determining if one or more enriched synthetic transactions from the subset of feasible fraudulent transaction data is classified as a non-fraudulent transaction. It is noted that the vulnerability report indicates one or more vulnerabilities in the simulated authorization model. Furthermore, the risky transaction classifier engine 224 is configured to transmit the vulnerability report to the issuer server 114.

Figure 3A:
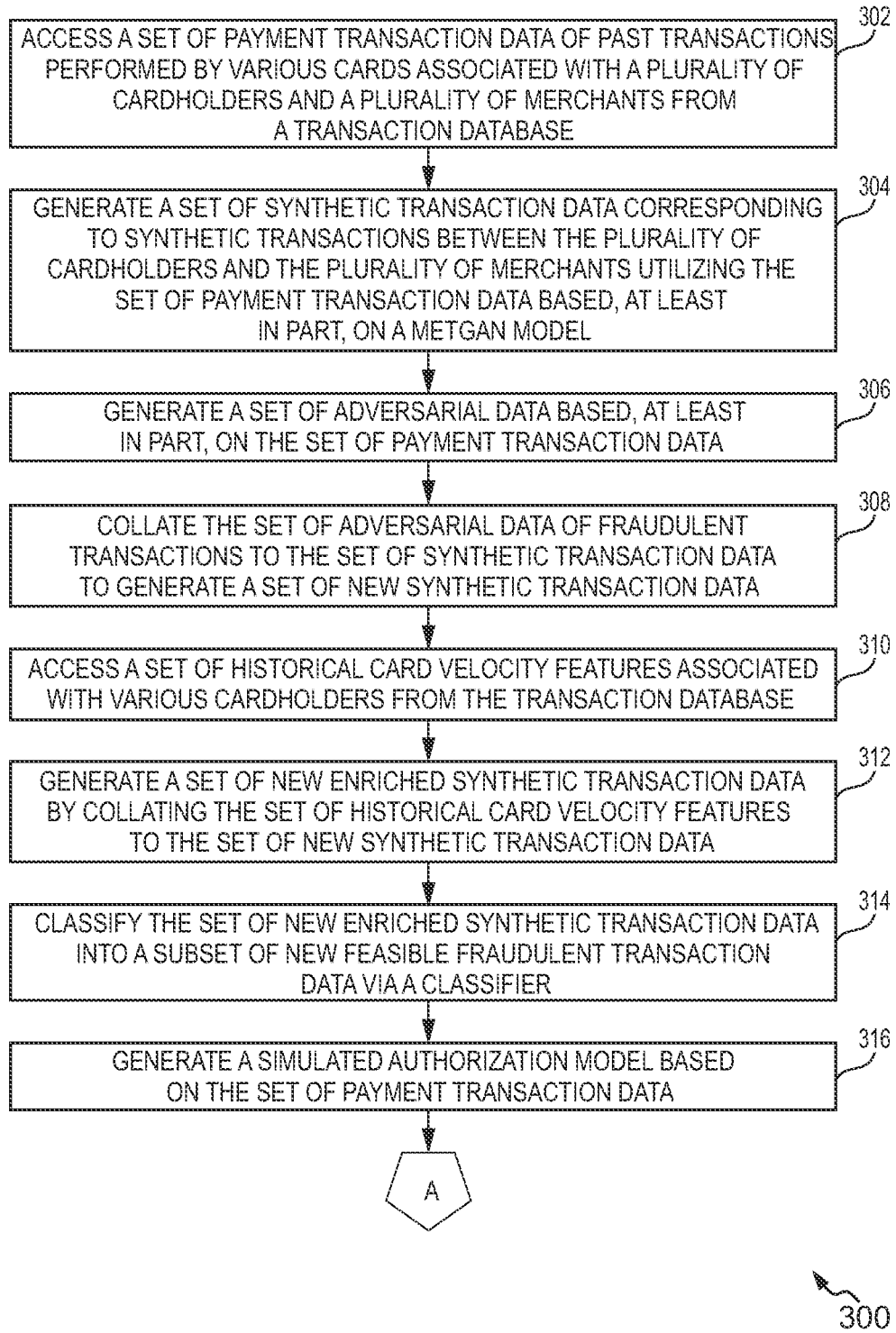
FIGS. 3A and 3B, collectively, depict a flow diagram of determining vulnerabilities within the issuer authorization network, in accordance with an embodiment of the present disclosure.
Figure 3B:
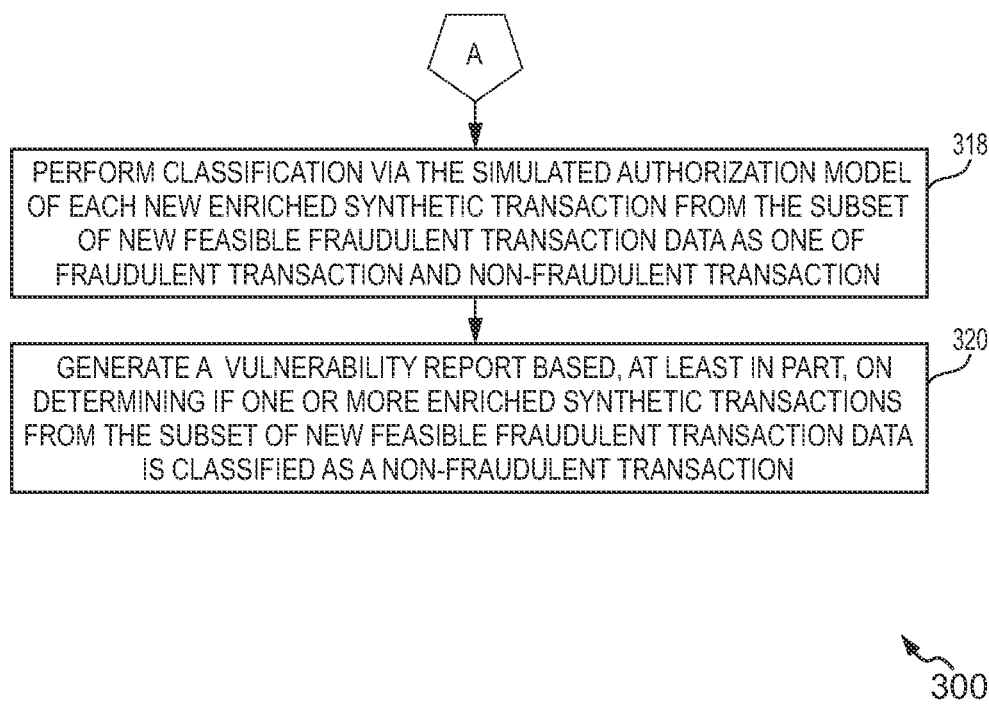

FIGS. 3A and 3B, collectively, a flow diagram 300 of determining vulnerabilities within the issuer authorization network, in accordance with an embodiment of the present disclosure. The sequence of operations of the flow diagram 300 may not be necessarily executed in the same order as they are presented. Further, one or more operations may be grouped together and performed in form of a single step, or one operation may have several sub-steps that may be performed in parallel or a sequential manner.

At 302, the server system 200 accesses a set of payment transaction data of past transactions performed by various cards associated with a plurality of cardholders and a plurality of merchants from the transaction database 110. The server system 200 is configured to gather the transaction data of the plurality of payment transactions from the transaction database 110 that was previously marked as a fraudulent or highly risky transaction by the issuer authorization network while authorizing the transactions.

At 304, the server system 200 generates a set of synthetic transaction data corresponding to synthetic transactions between the plurality of cardholders and the plurality of merchants utilizing the set of payment transaction data based, at least in part, on a MeTGAN model. The server system 200 is configured to generate the set of synthetic transaction data consisting of synthetic fraudulent transaction datasets using the memory efficient conditional generative adversarial network (MeTGAN) model. In one embodiment, the MeTGAN model generates the set of synthetic transaction data by adding a certain amount of noise or perturbation into the input data based on a condition using a generator and a discriminator (describer later with reference to FIG. 4). It is noted that since the input transaction data into the MeTGAN are fraudulent transactions, the output synthetic transaction data are also fraudulent transactions.

At 306, the server system 200 generates a set of adversarial data based, at least in part, on the set of payment transaction data. In one embodiment, the set of adversarial data is generated via an AI or ML model using different adversarial attack methods. In another embodiment, the set of adversarial data is generated by attacking the simulated authorization model using a black-box attack. Herein, the set of adversarial data indicates negative perturbations in the set of payment transaction data. In a non-limiting example, wherein the black-box attack is one of Zeroth-order optimization, HopskipJump, Boundary attack, GenAttack and the like.

At 308, the server system 200 collates the set of adversarial data of fraudulent transactions to the set of synthetic transaction data to generate a set of new synthetic transaction data. In an example, the server system 200 is configured to add the set of adversarial sample data to the set of synthetic transaction data generated by the MeTGAN model. The adversarial data is added to the synthetic transaction data to increase the potency of the synthetic samples while performing the test cases with the simulated authentication model 226.

At 310, the server system 200 accesses a set of historical card velocity features associated with various cardholders from the transaction database 110. The set of historical card velocity features includes information such as a number of transactions performed using the card over a given period of time, a number of times the card was used at a particular merchant, an average card spend, transaction amount for each card, and the like.

At 312, the server system 200 generates a set of new enriched synthetic transaction data by collating the set of historical card velocity features to the set of new synthetic transaction data. In other words, the server system 200 is configured to enrich an already created set of new synthetic transaction data with various card velocity features. Specifically, the data enrichment engine 222 concatenates each of the synthetic transactions from the set of new synthetic transaction data with different historical card velocity features from the set of historical card velocity features extracted from the transaction database 110.

At 314, the server system 200 classifies the set of new enriched synthetic transaction data into a subset of new feasible fraudulent transaction data via a neural network classifier (as described earlier using the risky transaction classifier engine 224). The server system 200 is configured to use a neural network classifier to identify feasible fraudulent transactions from the generated new enriched synthetic transaction data. This is to ensure that the generated transactions from MeTGAN are feasible before using them to attack the simulated authorization model 226. Thereafter, this classifier can also be used to classify fraudulent transactions into different types of fraud classes.

At 316, the server system 200 generates a simulated authorization model 226 based on the set of payment transaction data. The simulated authorization model 226 is configured to mimic an issuer authorization model framework of the issuer 114 that is implemented via the issuer authorization model 112. It is noted that the simulated authorization model 226 is a replica of the actual issuer authorization model framework used by the issuer in its issuer server 114 (i.e., the issuer authorization model 112).

At 318, the server system 200 performs classification via the simulated authorization model 226 of each new enriched synthetic transaction from the subset of new feasible fraudulent transaction data as one of fraudulent transaction and non-fraudulent transaction. Since, the simulated authorization model 226 is a replica of the issuer authorization model 112 through which the issuer server 114 authorizes fair transactions and declines fraudulent transactions, the results of the classification via the simulated authorization model 226 will reflect or mimic the results if the same dataset was fed to the issuer authorization model 112. To that end, if the simulated authorization model 226 authorizes a fraudulent transaction, then it shows there is a vulnerability or a loop hole in the issuer authorization model 112 being deployed by the issuer server 114 for that particular type of fraudulent transaction.

At 320, the server system 200 generates a vulnerability report based, at least in part, on determining if one or more enriched synthetic transactions from the subset of new feasible fraudulent transaction data is classified as a non-fraudulent transaction. To that end, the server system 200 is configured to determine if particular fraudulent or high-risk transactions will be authorized by the issuer authorization model 112 and add these findings in the vulnerability reports (or assessment reports). In some scenarios, these reports can be either used for internal chargeback risk assessment or transmitted to the issuer server 114 so that the issuer may fix these vulnerabilities.

Figure 4:
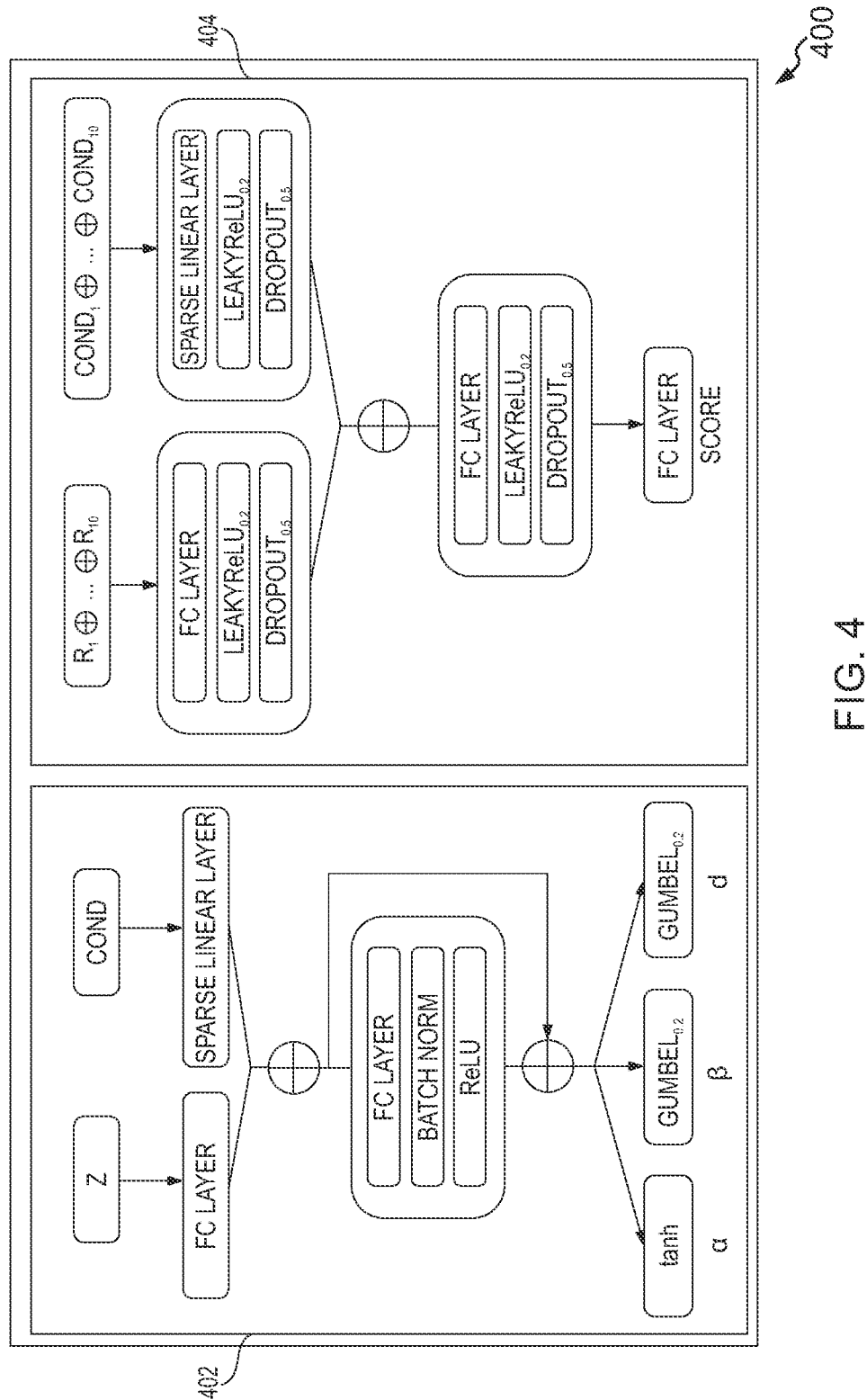
FIG. 4 is a schematic block diagram representation of a memory-efficient conditional generative adversarial network (MeTGAN) architecture, in accordance with an embodiment of the present disclosure.

Referring now to FIG. 4, a schematic block diagram representation 400 of a memory-efficient conditional generative adversarial network (MeTGAN) architecture, is shown, in accordance with an embodiment of the present disclosure. The proposed architecture enables the generation of the set of synthetic transaction data (or the set of synthetic transaction samples) using a generator 402 and a discriminator 404. It is noted that the MetGAN architecture or model is configured to handle datasets with high cardinality categorical columns with a minimal performance difference.

In an embodiment, the MeTGAN architecture is designed to overcome the shortcomings of a conditional generative adversarial network (CTGAN). As may be understood, the conditional vector in CTGAN is sparse, most of its values are zero, once being conditioned columns of the real data. This conditional vector is concatenated with a noise vector before passing it as an input to the generator. Similarly, in the case of the discriminator, the input is the concatenation of the conditional vector with either the generated data or the real data. For datasets with high cardinality, this concatenated vector becomes large and leads to a memory bottleneck, therefore CTGAN is highly memory inefficient for high cardinality. Moreover, in the generator, an addition of a residual layer over this large vector further escalates the memory requirements. On the other hand, in the proposed MeTGAN model, the above-mentioned issues are fixed. At first, the conditional vector is not concatenated, neither with the noise vector in the case of the generator nor with real/generated data in the case of the discriminator. Second, the first residual layer of the generator is removed in MeTGAN. In the case of the generator, the noise vector is passed through a linear layer and the conditional vector is passed through a separate sparse linear layer. To that end, the outputs from these layers are concatenated before passing them to the next layer. For the discriminator, the real/generated data is passed through a fully connected layer with Leaky Rectified Linear Unit (LeakyReLU) activation and Dropout, whereas for the conditional vector the fully connected layer is replaced by a sparse linear layer. Therefore, the outputs of these layers are also concatenated before passing them to the next layer.

In an embodiment, the MeTGAN architecture 400 includes the generator 402 and the discriminator 404 to generate the set of synthetic transaction data. The MeTGAN architecture 400 is designed to overcome the shortcomings of the conditional generative adversarial network (CTGAN) on large datasets with high cardinality. The generator 402 includes a fully connected layer and a sparse linear layer, a batch normalization layer, a ReLU activation layer, and several functions such as tan H which outputs the value $\alpha$, and $gumbel_{0.2}$ which outputs the values $\beta$ and d.

The fully connected layer (FC-layer) is inputted with the subset of fraudulent transaction data from the set of payment transaction data accessed from the transaction database 110 for generating the set of synthetic transaction data. Further, the sparse linear layer is provided the conditions for the generation of the set of synthetic transaction data. It is noted that the sparse linear layer reduces the operational complexity of the neural network and hence, reduces the memory space. The inputs are then sent into a residual layer including another FC-layer, a batch normalization layer where normalization of data is performed in batches and is further passed onto the ReLU activation layer. Further, the generator 402 outputs the values of $\alpha$, $\beta$, and d.

The discriminator 404 includes a plurality of input data and a plurality of conditions which is input into two different residual layers including FC-layer, a $leakyReLU_{0.2}$ activation layer, and a $dropout_{0.5}$. The outputs of the two different residual layers are then concatenated and passed onto another residual layer including an FC-layer, a leakyReLU$_{0.2}$ activation layer, and a dropout$_{0.5}$. The output of that layer is further passed onto an FC-layer to generate a score.

In an embodiment, in the MeTGAN architecture 400, the first residual layer of the generator 402 is removed. In the case of the generator 402, the noise vector is passed through a linear layer and the conditional vector is passed through a separate sparse linear layer. In addition, outputs from these layers are concatenated before passing them to the next layer. For the discriminator 404, the real/generated data is passed through a fully connected layer with LeakyReLU activation and dropout, whereas for the conditional vector the fully connected layer is replaced by a sparse linear layer. The outputs of these layers are also concatenated before passing them to the next layer.

The sparse input layer is implemented by converting the input to a sparse tensor and performing the multiplication of weights and the addition of bias with the sparse tensor.

In a non-limiting example, the MeTGAN architecture 400 is trained with a batch size of 500 and is trained for 300 epochs. The MeTGAN architecture 400 consists of 5 discriminator steps for news and adult datasets and 1 discriminator step for loan dataset per step of the generator 402. Further, an Adam optimizer is used with the generator 402 with a learning rate equal to 1e-6 and the discriminator 404 with a learning rate equal to 2e-4.

In another non-limiting example, a comparison between different models is performed. For this comparison, two publicly available datasets are considered: (1) an Adult dataset and (2) a News dataset. The objective of taking these two datasets is that they are widely used in synthetic tabular data literature, the Adult dataset poses a classification problem and the News dataset presents a regression problem. This helps to better analyze the performance of the models on the two major facets of machine learning on tabular data i.e., regression and classification. The statistics associated with the datasets are shown in Table I. Further, to compare the performance of CTGAN and the MeTGAN model on a dataset with high cardinality, the Loan dataset is used. A sample size of 150 k data points is selected from the Loan dataset as it has a sufficiently large number of total distinct categories across columns (21009) to test the memory efficacy of the MeTGAN model. The statistics of the Loan dataset are also shown in Table I. Here, all the columns of the Adult dataset are utilized and the goal is to classify whether the income of the person is >$50 k or ≤$50 k. In the News dataset, the two non-predictive columns i.e., URL and time delta are removed before using the news data for the experiments and the goal of the dataset is to predict the number of times the news article is going to be shared, given some extracted features of the news article. In the Loan dataset, the original dataset has 27 columns and about 900 k rows. However, using the complete data may introduce a very large number of categories that would cause CTGAN to not perform well. Therefore, a sample of 150 k rows and 21 columns (removed ApprovalDate, ChgOffDate, City, DisbursementDate, LoanNr_ChkDgt, and Name) are used, such that sufficient information is captured by the data without the need for all the columns. The dataset is used to predict the SBA's guaranteed amount of approved loans.

TABLE I

| Name | Train/Test | #N | #C | #Categories |
|---|---|---|---|---|
| Adult | 26k/6.5k | 6 | 9 | 104 |
| News | 31k/8k | 45 | 14 | 28 |
| Loan | 120k/30k | 11 | 10 | 21k |

It is noted that in Table 1, the labels '#N' and '#C' represent the number of continuous (numerical) and categorical columns in the dataset respectively. Further, the label '#Categories' is the total number of categories across all the categorical columns.

All the models are trained on the Adult and News datasets and only CTGAN and the MeTGAN model are trained on the Loan dataset. The models are compared on the machine learning efficacy (ML Efficacy), statistical tests like the Chi-square and Kolmogorov-Smirnov tests, and some privacy metrics—CategoricalCAP and NumericalLR. Additionally, on the Loan dataset, a comparison of the GPU memory utilization is also presented (see, Table IV).

The performance of the various other conventional GAN based-models such as TGAN, cWGAN, medGAN, tableGAN on the Adult dataset is shown in Table II. It is noted that in terms of ML Efficacy, except medGAN, all models have a reasonably good performance. The MeTGAN model has the best performance in this test among all the conventional GAN based-models. The MeTGAN model has a good CategoricalCAP score and is comparable to CTGAN. Overall, the CTGAN and the MeTGAN model seem to be the most balanced methods for synthetic data generation for Adult data, with the MeTGAN model being slightly better than the CTGAN for this dataset.

TABLE II

| Dataset | Model | ΔF1-LR | ΔF1-RFC | CS test | KS test | DTR mean | DTR std | Categorical CAP |
|---|---|---|---|---|---|---|---|---|
| Adult | MeTGAN | 0.013 | 0.028 | 0.987 | 0.813 | 1.711 | 0.706 | 0.300 |
| | CTGAN | 0.030 | 0.035 | 0.970 | 0.773 | 1.782 | 0.732 | 0.310 |
| | TGAN | 0.085 | 0.087 | 0.990 | 0.917 | 1.742 | 0.727 | 0.304 |
| | cWGAN | 0.051 | 0.030 | 0.906 | 0.596 | 1.890 | 0.619 | 0.232 |
| | medGAN | 0.719 | 0.725 | 0.872 | 0.109 | 2.246 | 0.975 | 0.035 |
| | tableGAN | 0.036 | 0.052 | 0.976 | 0.610 | 1.826 | 0.537 | 0.303 |

The table III shows the performance of the News dataset. On this dataset, the MeTGAN model and medGAN have reasonably good performance. Since all are numerical values/binary features, i.e. no multi-class features, the CS test cannot be performed on the data and is NA for all models. The DTR mean and DTR std methods do not reveal much information here but the MeTGAN model has a higher DTR mean and the relatively good NumericalLR score confirms that the higher DTR mean is a positive sign. Overall, the MeTGAN model has stable performance.

TABLE III

| Dataset | Model | ΔMSE-Ridge | ΔMSE-ElasticNet | CS test | KS test | DTR mean | DTR std | NumericalLR |
|---|---|---|---|---|---|---|---|---|
| News | MeTGAN | 154 | 125 | NA | 0.915 | 3.041 | 5.433 | 0.263 |
| | CTGAN | 87 | 106 | NA | 0.910 | 2.903 | 5.430 | 0.279 |
| | TGAN | 408 | 2491 | NA | 0.902 | 2.787 | 5.389 | 0.267 |
| | medGAN | 128 | 126 | NA | 0.965 | 2.026 | 5.436 | 0.182 |
| | tableGAN | 540 | 262 | NA | 0.585 | 2.741 | 5.235 | 0.217 |

Table IV shows the results of the CTGAN and the MeTGAN model on the Loan dataset. This dataset proves its use as a testing mechanism for the actual efficacy of tabular GANs. It can be seen that both CTGAN and the MeTGAN model do not perform well on this dataset in terms of ML Efficacy scores. They yield a very high MSE score. In the ML Efficacy metrics, the MeTGAN model outperforms CTGAN on the Random Forest regressor test and marginally loses out on the ElasticNet test. In the privacy metrics, the performance of CTGAN and the MeTGAN model are very close to each other.

TABLE IV

| Dataset | Model | GPU Mem. | ΔMSE-RFR | ΔMSE-ElasticNet | CS test | KS test | DTR mean | DTR std | NumericalLR |
|---|---|---|---|---|---|---|---|---|---|
| Loan | MeTGAN | 3.2 GB | 64015 | 23320 | 0.632 | 0.716 | 3.007 | 1.234 | 0.093 |
| | CTGAN | 16.3 GB | 74323 | 23082 | 0.656 | 0.755 | 2.746 | 2.626 | 0.115 |

From the above analysis, it should be noted that the MeTGAN model requires 80% less memory to provide comparable performance as the CTGAN. The use of the sparse layers for the model resulted in memory-efficient operations over the sparse conditional vector. Additionally, removing the first residual layer from the generator 402 helped to reduce the size of the input to the next layer by not concatenating the large conditional vector along with the output of the first layer. These two reasons primarily caused the reduction in GPU memory usage while not hampering the performance of the MeTGAN model significantly.

Figure 5:
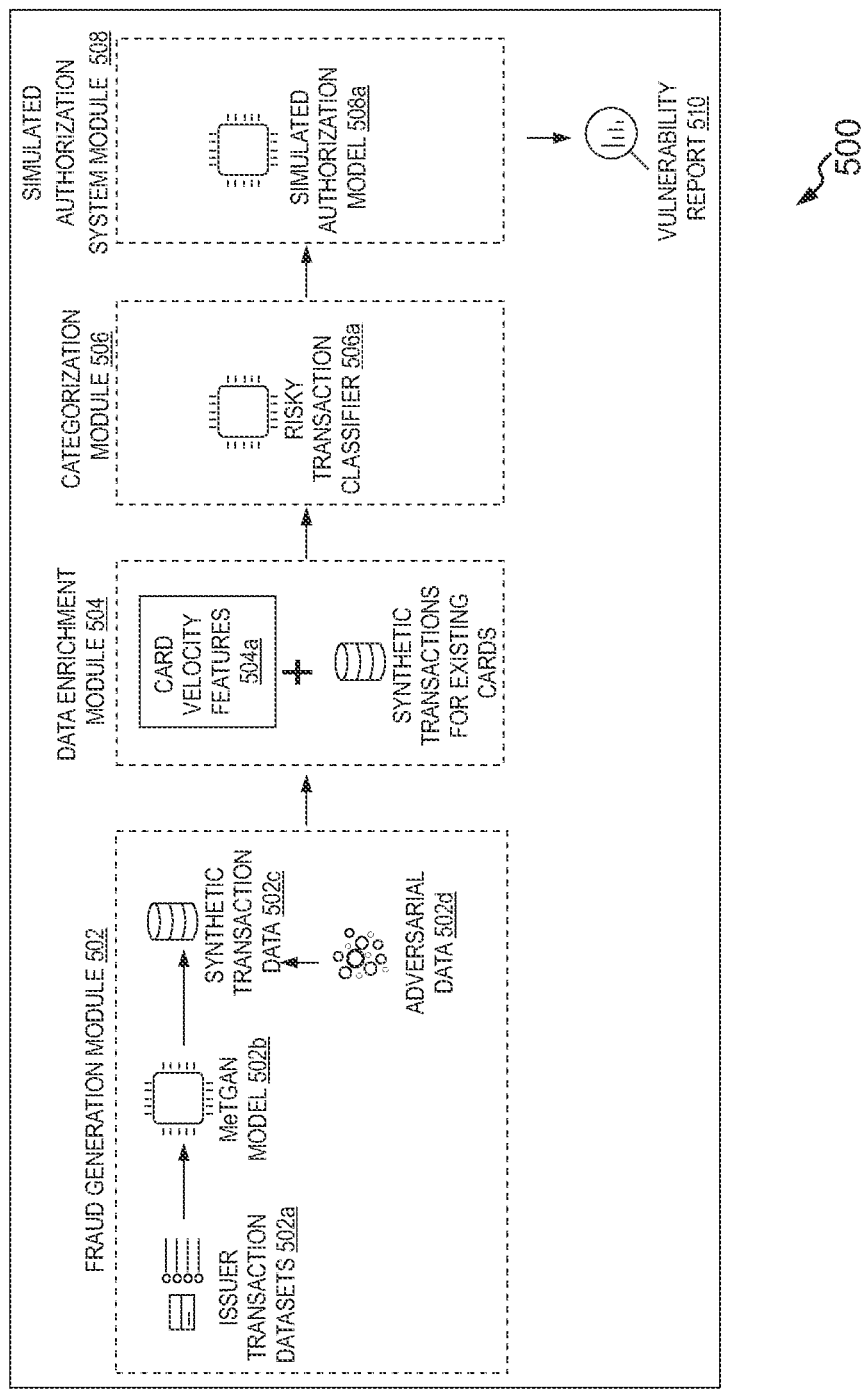
FIG. 5 is a schematic block diagram representation of the issuer vulnerability assessment model, in accordance with an embodiment of the present disclosure.

FIG. 5 is a schematic block diagram representation 500 of the issuer vulnerability assessment model 108, in accordance with an embodiment of the present disclosure. The block diagram representation 500 depicts the process of generating the set of synthetic transaction data and utilizing the generated synthetic transaction data to mislead the issuer authorization system, i.e., the issuer authorization model 112 into authorizing the fraudulent transaction to assess and generate a vulnerability report 510. The issuer vulnerability assessment model 108 includes various modules such as a fraud generation module 502, a data enrichment module 504, a categorization module 506, and a simulated authorization system module 508 for generating the vulnerability report 510.

The fraud generation module 502 is configured to generate a set of synthetic transaction data indicating synthetic fraudulent transactions using a memory-efficient conditional generative adversarial network (MeTGAN) architecture (e.g., the MeTGAN model) based on a set of fraudulent transaction data. The fraud generation module 502 includes issuer transaction datasets 502a (i.e., the subset of fraudulent transaction data), a MeTGAN model 502b, a synthetic transaction data 502c (i.e., the set of synthetic transaction data), and adversarial data 502d (i.e., the set of adversarial data).

The issuer transaction datasets 502a consists of a plurality of historical fraudulent and high-risk transactions that may be previously declined and flagged by the issuer authorization network as fraudulent or high-risk transactions. The issuer transaction datasets 502a may be stored in the transaction database 110. In one embodiment, the issuer transaction datasets 502a are fed as input into the MeTGAN model 502b to generate the synthetic transaction data 502c.

The MeTGAN model 502b is a generative adversarial network model based on the conditional generative adversarial network (CTGAN) model. In one embodiment, the MeTGAN model 502b is a memory-efficient conditional generative adversarial network architecture model that generates the synthetic transaction data 502c in the most efficient way possible. The MeTGAN model 502b inputs the issuer transaction datasets 502a to generate the synthetic transaction data 502c. The MeTGAN model 502b consists of a generator (e.g., the generator 402) that inputs the issuer transaction datasets 502a into a fully connected neural network layer based on a condition that is input through a sparse linear layer and generates the synthetic transaction data 502c using only 1 residual layer, thus saving memory. Further, the MeTGAN model 502b consists of a discriminator (e.g., the discriminator 404) that tries to discriminate the generated synthetic transaction data 502c and the input to try and determine the differences in the synthetic transaction data 502c.

The synthetic transaction data 502c consists of a plurality of synthetic fraudulent and high-risk transaction data generated by the MetGAN model 502b. In one embodiment, the synthetic transaction data 502c includes various transactions that include minor variations in the transaction features or parameters of the issuer transaction datasets 502a. The synthetic transaction datasets 502c are generated based on distribution check, ML models performance check, correlation check, and the like.

The adversarial data 502d includes a plurality of negative perturbations. The adversarial data 502d is added to the synthetic transaction data 502c to ensure that the generated synthetic transaction data 502c is a fraudulent or high-risk transaction. In one embodiment, the adversarial data 502d is generated by attacking the issuer authorization model 112 or the simulated authorization model 226 using various adversarial attacks such as black-box attacks to generate the adversarial data 502d. The black box attacks may include, but are not limited to Zeroth-order optimization, HopskipJump, Boundary attack, and GenAttack.

The data enrichment module 504 is configured to create feature-enriched synthetic transaction data for existing cards of the cardholder. The data enrichment module 504 includes a database such as the transaction database 110 consisting of card velocity features 504a (i.e., the set of historical card velocity features). In one embodiment, the data enrichment module 504 adds the card velocity features 504a to the synthetic transactional data 502c to create feature-rich synthetic transaction data (i.e., the set of enriched synthetic transaction data). The card velocity features 504a are added into the synthetic transaction data 502c so that the issuer vulnerability model 108 learns to identify the fraudulent transaction where there are minor variations in the velocity features of the payment card. The data enrichment module 504 concatenates each of the synthetic transaction data 502c with historic card velocity features extracted from the transaction database 110. The card velocity features 504a include the number of transactions conducted with the same card over a given period of time, types of payment cards used at merchants, average card spend threshold, amount transacted by a particular payment card, etc.

The categorization module 506 is configured to classify and categorize the plurality of feature-rich synthetic transaction data 502c into feasible or unfeasible transactions. In one embodiment, the categorization module 506 includes a risky transaction classifier 506a that classifies the feature-rich synthetic transaction datasets into feasible or unfeasible transactions. In another embodiment, the risky transaction classifier 506a may include but is not limited to a perceptron-based classifier, a Naive Bayes classifier, a Decision Tree-based classifier, a Logistic Regression based classifier, K-Nearest Neighbor classifier, an Artificial Neural Networks/Deep Learning-based classifier, or a Support Vector Machine. In another embodiment, the risky transaction classifier 506a may also be used to classify the synthetic transaction data 502c indicating fraudulent transaction data into different types of fraud classes. The feature-rich synthetic transaction datasets having high fraud probability may further be passed onto the simulated authorization module 508.

The simulated authorization system module 508 is configured to authorize or decline synthetic payment transactions. In one embodiment, the simulated authorization system module 508 includes a simulated authorization model 508a (same as simulated authorization model 226), which may further approve or decline the synthetic payment transactions received from the risky transaction classifier 506a. The simulated authorization system module 508 is fed with only the fraudulent transactions to try and fool the simulated authorization model 508a into authorizing the transaction. In another embodiment, the simulated authorization system module 508 is a replica of the issuer authorization framework (i.e., implemented via the issuer authorization model 112) of any given issuer such as the issuer 114. It is noted that the simulated authorization system module 508 is an issuer-specific model and varies for each issuer in the payment network 104.

The vulnerability report 510 is configured to assess and determine the vulnerabilities in the simulated authorization system module 508. The vulnerability report 510 is generated based on the loopholes and security gaps determined in the simulated authorization system module 508 when a synthetic fraudulent transaction gets approved by the simulated authorization model 580a. The vulnerability report 510 provides insights to the issuers using graphs and data pertaining to potential authorization breaches in the issuer authorization model 112 by a particular type of fraudulent transaction.

Figure 6A:
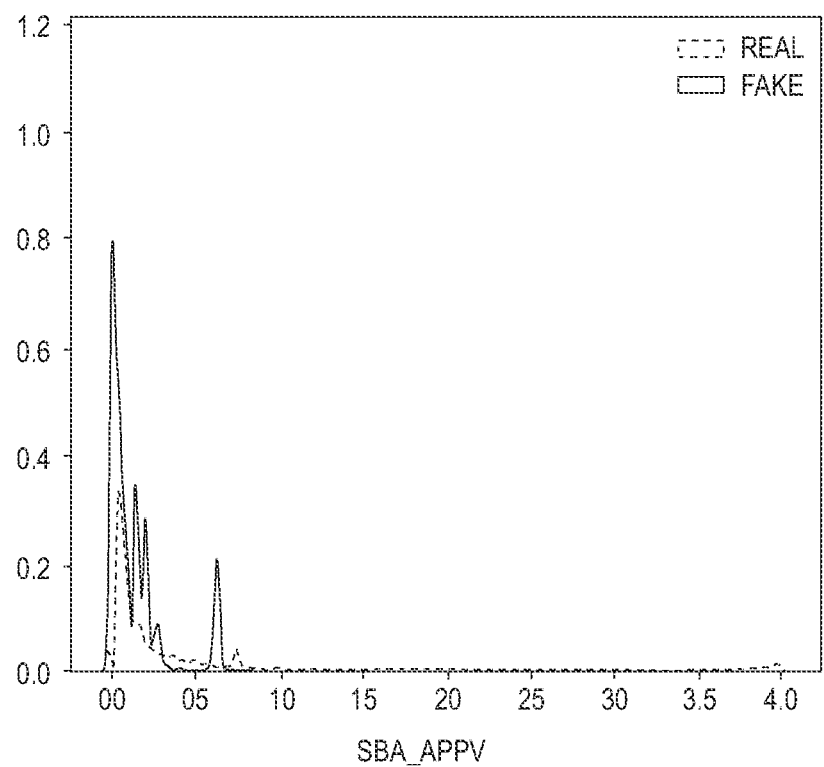
FIGS. 6A and 6B depict a distribution of real and synthetic transaction data using the MeTGAN model on four sample columns of the Loan dataset, in accordance with an embodiment of the present disclosure.
Figure 6B:
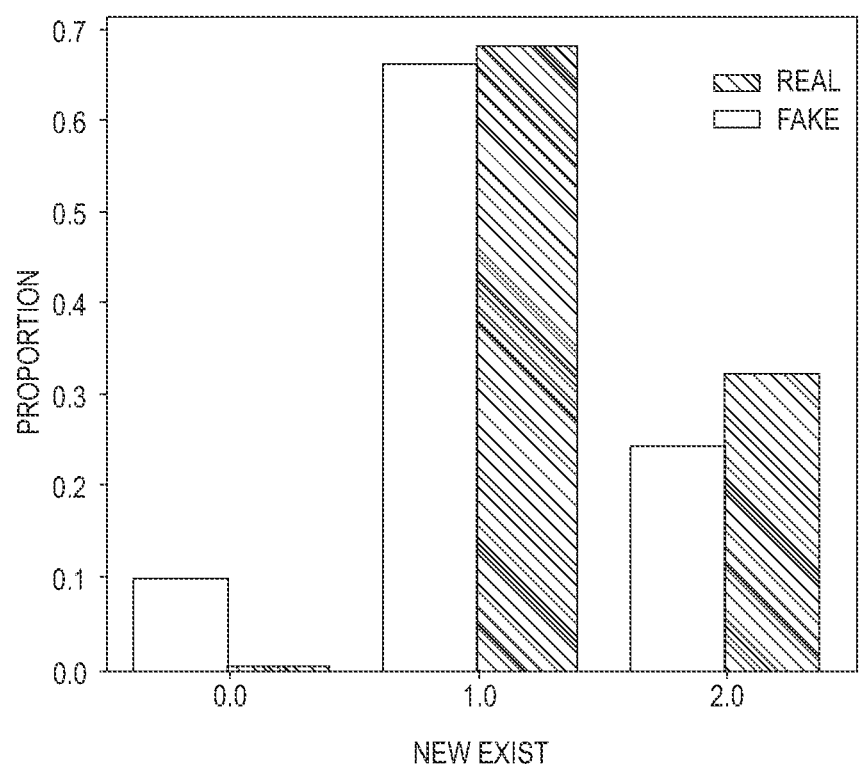

FIGS. 6A and 6B depict the distribution of real and synthetic transaction data using the MeTGAN model on four sample columns of the Loan dataset, in accordance with an embodiment of the present disclosure. FIG. 6A shows graph 600 which includes distribution of real and synthetic transaction data using the MeTGAN model on four sample columns of the Loan dataset of SBA_Appv distribution and FIG. 6B shows a graph 620 which includes the distribution of real and synthetic transaction data using the MeTGAN model on four sample columns of the Loan dataset of New Exists distribution. To that end, the graph plots show the distribution of real and fake transaction data for the SBA_Appv distribution and New Exists distribution.

As explained earlier MeTGAN performs on par with other conventional GAN based-approaches. In addition, for large datasets, MeTGAN considerably reduces memory consumption without any significant degradation in performance. This is opposed to the general notion that lighter models perform worse than large models. Reducing the memory footprint of models is highly desired, for large pre-trained language models, speech recognition, and computer vision. Embodiments of the present disclosure describe the MeTGAN model that can handle a high cardinality categorical dataset like the Loan dataset. It is noted that the current architecture of the conventional GAN based-models, is not yet capable of capturing the distribution well when there are a large number of columns and categories. On the other hand, MeTGAN can capture the nuances in variance very well.

Figure 7:
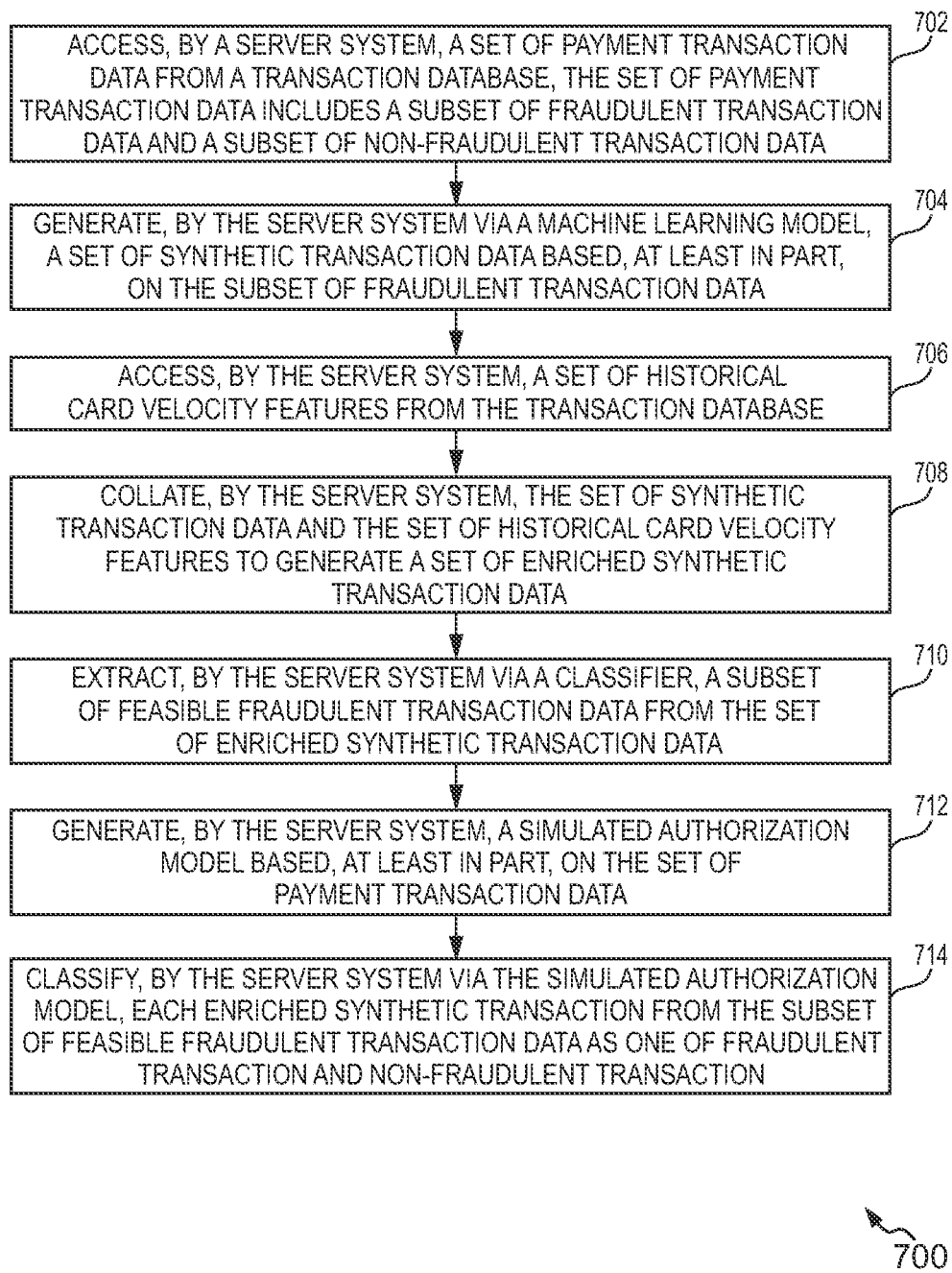
FIG. 7 illustrates a method for generating synthetic feasible fraudulent transaction data for vulnerability assessment, in accordance with another embodiment of the present disclosure.

FIG. 7 illustrates a method 700 for generating synthetic feasible fraudulent transaction data for vulnerability assessment, in accordance with another embodiment of the present disclosure. The sequence of operations of the method 700 may not be necessarily executed in the same order as they are presented. Further, one or more operations may be grouped together and performed in form of a single step, or one operation may have several sub-steps that may be performed in parallel or in a sequential manner.

At 702, the method 700 includes accessing, by a server system 200, a set of payment transaction data from a transaction database 110. The set of payment transaction data includes a subset of fraudulent transaction data and a subset of non-fraudulent transaction data.

At 704, the method 700 includes generating, by the server system 200 via a machine learning model, a set of synthetic transaction data based, at least in part, on the subset of fraudulent transaction data.

At 706, the method 700 includes accessing, by the server system 200, a set of historical card velocity features from the transaction database 110.

At 708, the method 700 includes collating, by the server system 200, the set of synthetic transaction data and the set of historical card velocity features to generate a set of enriched synthetic transaction data.

At 710, the method 700 includes extracting, by the server system 200 via a classifier, a subset of feasible fraudulent transaction data from the set of enriched synthetic transaction data.

At 712, the method 700 includes generating, by the server system 200, a simulated authorization model based, at least in part, on the set of payment transaction data. The simulated authorization model (such as simulated authorization model 226) is a replica of an issuer authorization model 112 associated with an issuer server (such as the issuer server 114).

At 714, the method 700 includes classifying, by the server system 200 via the simulated authorization model 226, each enriched synthetic transaction from the subset of feasible fraudulent transaction data as one of fraudulent transaction and non-fraudulent transaction.

Figure 8:
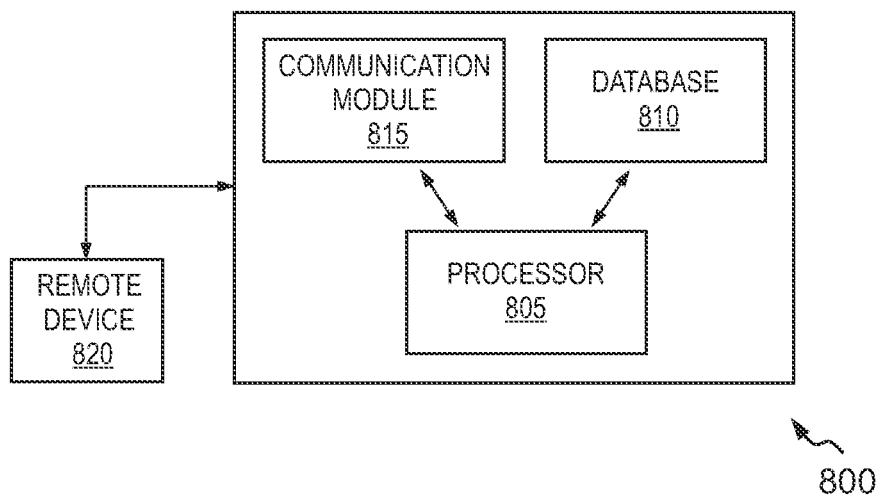
FIG. 8 is a simplified block diagram of an issuer server, in accordance with one embodiment of the present disclosure.

FIG. 8 is a simplified block diagram of an issuer server 800, in accordance with one embodiment of the present disclosure. The issuer server 800 is associated with an issuer bank/issuer, in which a cardholder may have an account. The issuer server 800 is an example of the issuer server 114 of FIG. 1, or maybe embodied in the issuer server 114. The issuer server 800 includes a processor 805 communicably coupled to a database 810 and a communication module 815. The components of the issuer server 800 provided herein may not be exhaustive, and the issuer server 800 may include more or fewer components than those depicted in FIG. 8. Further, two or more components may be embodied in one single component, and/or one component may be configured using multiple sub-components to achieve the desired functionalities. Some components of the issuer server 800 may be configured using hardware elements, software elements, firmware elements, and/or a combination thereof.

The database 810 includes information associated with the cardholder, such as, but not limited to, a primary account number (PAN one or more parameters), a name, a city, a postal code, and the like.

Via the communication module 815, the processor 805 may receive information from a remote device 820 such as the issuer server 114, the server system 102, and the payment server 106. In an embodiment, the processor 805 may communicate the information related to the payment transaction to the server system 102 for assessing vulnerabilities in the authorization network of the issuer.

Figure 9:
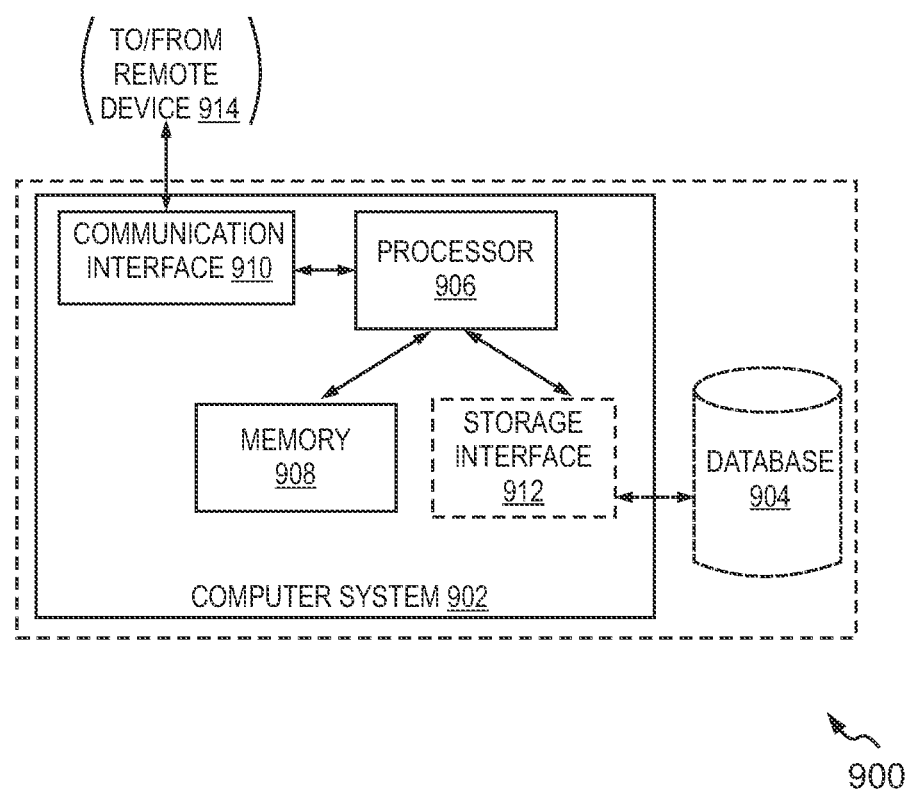
FIG. 9 is a simplified block diagram of a server system, in accordance with an embodiment of the present disclosure.

FIG. 9 is a simplified block diagram of a server system 900, in accordance with one embodiment of the present disclosure. The server system 900 shows hardware configuration of the server system 102. The server system 900 includes a computer system 902 and a database 904. In an embodiment, the server system 900 is integrated, but not limited to, in the issuer server 114 or in the payment server 106 (Referring to FIG. 1).

The computer system 902 includes at least one processor 906 configured to execute executable instructions for implementing various embodiments of the present disclosure. The executing instructions are stored in a memory 908. The components of the computer system 902 provided herein may not be exhaustive and the computer system 902 may include more or fewer components than those depicted in FIG. 9. Further, two or more components may be embodied in one single component, and/or one component may be configured using multiple sub-components to achieve the desired functionalities. Some components of the computer system 902 may be configured using hardware elements, software elements, firmware elements and/or a combination thereof.

The processor 906 is operatively coupled to a communication interface 910 such that the computer system 902 is capable of communicating with a remote device 914 such as the issuer server 114, or the payment server 106 associated with the payment network 104 or of communicating with any entity connected to the network 118 (shown in FIG. 1) or any constituents of the server system 102. In an embodiment, the processor 906 may be capable of accessing the set of payment transaction data associated with the various cardholders from the database 904. The processor 906 may further be configured to generate a set of synthetic transaction data using a MetGAN model. The processor 906 may then be able to classify the set of synthetic transaction data into feasible and unfeasible transaction data and then determine vulnerability in the simulated authorization model 226 (see, FIG. 1) based upon authorizations provided by the simulated authorization model 226.

In some embodiments, the database 904 is integrated within the computer system 902. For example, the computer system 902 may include one or more hard disk drives as the database 904. A storage interface 912 is any component capable of providing the processor 906 with access to the database 904. The storage interface 912 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 906 with access to the database 904.

Figure 10:
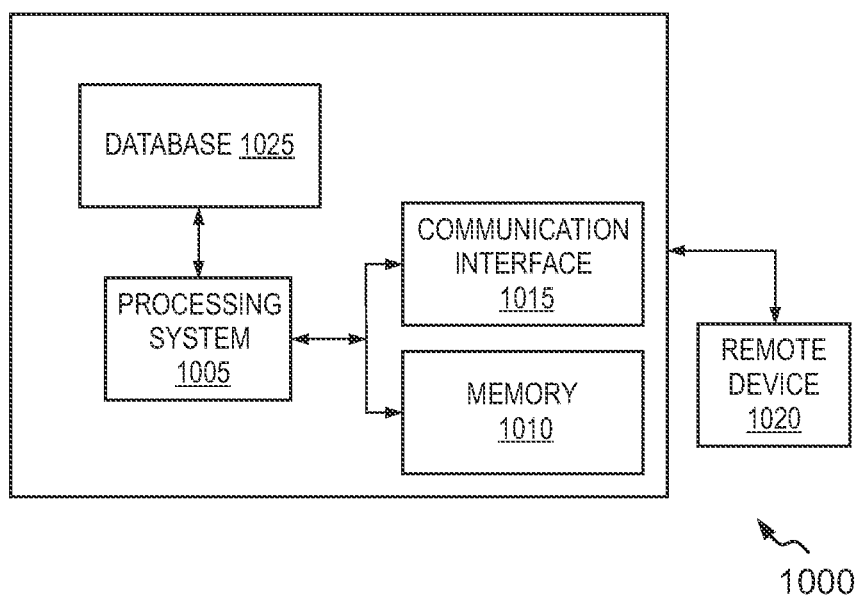
FIG. 10 is a simplified block diagram of a payment server, in accordance with an embodiment of the present disclosure.

FIG. 10 is a simplified block diagram of a payment server 1000, in accordance with an embodiment of the present disclosure. The payment server 1000 is an example of the payment server 106 of FIG. 1. A payment network (such as the payment network 104) may be used by the payment server 1000 as a payment interchange network. Examples of payment interchange network include, but not limited to, Mastercard® payment system interchange network. The payment server 1000 includes a processing system 1005 configured to extract programming instructions from a memory 1010 to provide various features of the present disclosure. Further, two or more components may be embodied in one single component, and/or one component may be configured using multiple sub-components to achieve the desired functionalities. Some components of the payment server 1000 may be configured using hardware elements, software elements, firmware elements, and/or a combination thereof.

In one embodiment, the payment server 1000 is configured to access a set of payment transaction data associated with the various cardholders from a database 1025 such as the transaction database 110. Then, the payment server 1000 is configured to generate a set of synthetic transaction data using a MetGAN model. Further, the payment server 1000 is configured to classify the set of synthetic transaction data into feasible and unfeasible transaction data and then determine vulnerability in the simulated authorization model 226 (see, FIG. 1) based upon authorizations provided by the simulated authorization model 226. Via a communication interface 1015, the processing system 1005 receives information from a remote device 1020 such as one or more databases. The processing system 1005 is operatively coupled to the communication interface 1015 such that the payment server 1000 is capable of communicating with the remote device 1020 or of communicating with any entity connected to the network 118 (shown in FIG. 1) or any constituents of the server system 102.

The methods disclosed in the flow charts 300 and 700 with reference to FIG. 3 and FIG. 7 respectively, and one or more operations of the server system 200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)

and executed on a computer (e.g., any suitable computer, such as a laptop computer, netbook, Webbook, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad scope of the invention. For example, the various operations, blocks, etc., described herein may be enabled and operated using hardware circuitry (for example, complementary metal-oxide-semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or the computer to perform one or more operations. A computer-readable medium storing, embodying, or encoded with a computer program, or similar language may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g. magneto-optical disks), CD-ROM (compact disc read-only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more nonvolatile memory devices, and/or a combination of one or more volatile memory devices and nonvolatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
   accessing, by a server system, a set of payment transaction data from a transaction database, the set of payment transaction data comprising a subset of fraudulent transaction data and a subset of non-fraudulent transaction data;
   generating, by the server system via a machine learning model, a set of synthetic transaction data based, at least in part, on the subset of fraudulent transaction data;
   accessing, by the server system, a set of historical card velocity features from the transaction database;
   collating, by the server system, the set of synthetic transaction data and the set of historical card velocity features to generate a set of enriched synthetic transaction data;
   extracting, by the server system via a classifier, a subset of feasible fraudulent transaction data from the set of enriched synthetic transaction data;
   generating, by the server system, a simulated authorization model based, at least in part, on the set of payment transaction data, the simulated authorization model being a replica of an issuer authorization model associated with an issuer server; and
   classifying, by the server system via the simulated authorization model, each enriched synthetic transaction from the subset of feasible fraudulent transaction data as one of fraudulent transaction and non-fraudulent transaction.

2. The computer-implemented method as claimed in claim 1, further comprising:
   generating, by the server system, a vulnerability report based, at least in part, on determining if one or more enriched synthetic transactions from the subset of feasible fraudulent transaction data is classified as a non-fraudulent transaction, the vulnerability report indicating one or more vulnerabilities in the simulated authorization model; and
   transmitting, by the server system, the vulnerability report to the issuer server.

3. The computer-implemented method as claimed in claim 1, further comprising:
   generating, by the server system, a set of adversarial data based, at least in part, on the set of payment transaction data;
   collating, by the server system, the set of synthetic transaction data and the set of adversarial data to generate a set of new synthetic transaction data;
   accessing, by the server system, the set of historical card velocity features from the transaction database;
   collating, by the server system, the set of new synthetic transaction data and the set of historical card velocity features to generate a set of new enriched synthetic transaction data;
   extracting, by the server system via the classifier, a subset of new feasible fraudulent transaction data from the set of new enriched synthetic transaction data;
   generating, by the server system, the simulated authorization model based, at least in part, on the set of payment transaction data, the simulated authorization model being a replica of an issuer authorization model associated with an issuer server; and
   classifying, by the server system via the simulated authorization model, each new enriched synthetic transaction from the subset of new feasible fraudulent transaction data as one of fraudulent transaction and non-fraudulent transaction.

4. The computer-implemented method as claimed in claim 3, further comprising:
   generating, by the server system, a vulnerability report based, at least in part, on determining if one or more enriched synthetic transactions from the subset of new feasible fraudulent transaction data is classified as a non-fraudulent transaction, the vulnerability report indicating one or more vulnerabilities in the simulated authorization model; and
   transmitting, by the server system, the vulnerability report to the issuer server.

5. The computer-implemented method as claimed in claim 3, wherein the set of adversarial data is generated by attacking the simulated authorization model using a black-box attack, the set of adversarial data indicating negative perturbations in the set of payment transaction data.

6. The computer-implemented method as claimed in claim 5, wherein the black-box attack is at least one of Zeroth-order optimization, HopskipJump, Boundary attack, and GenAttack.

7. The computer-implemented method as claimed in claim 1, further comprising:
   generating, by the server system, a vulnerability report based, at least in part, on determining if one or more enriched synthetic transactions from one of the subset of feasible fraudulent transaction data and the subset of new feasible fraudulent transaction data is classified as a non-fraudulent transaction, the vulnerability report indicating one or more vulnerabilities in the simulated authorization model; and
   transmitting, by the server system, the vulnerability report to the issuer server.

8. The computer computer-implemented method as claimed in claim 1, wherein the set of historical card velocity features comprises information related to a number of transactions performed using the card over a given period of time, a number of times the card was used by a particular merchant, an average card spend, a transaction amount for each card.

9. The computer-implemented method as claimed in claim 1, wherein the machine learning model is a memory-efficient conditional generative adversarial network (MeTGAN).

10. The computer-implemented method as claimed in claim 1, wherein the classifier is at least one of a perceptron-based classifier, a Naive Bayes classifier, a Decision Tree-based classifier, a Logistic Regression based classifier, a K-Nearest Neighbor classifier, an Artificial Neural Networks/Deep Learning-based classifier, or a Support Vector Machine (SVM).

11. The computer-implemented method as claimed in claim 1, wherein the server system is one of the issuer server and a payment server in a payment network.

12. A server system, comprising:
   a communication interface;
   a memory comprising executable instructions; and
   a processor communicably coupled to the communication interface and the memory, the processor configured to execute the instructions to cause the server system, at least in part, to:
   access a set of payment transaction data from a transaction database, the set of payment transaction data comprising a subset of fraudulent transaction data and a subset of non-fraudulent transaction data;
   generate via a machine learning model, a set of synthetic transaction data based, at least in part, on the subset of fraudulent transaction data;
   access a set of historical card velocity features from the transaction database;
   collate the set of synthetic transaction data and the set of historical card velocity features to generate a set of enriched synthetic transaction data;
   extract via a classifier a subset of feasible fraudulent transaction data from the set of enriched synthetic transaction data;
   generate a simulated authorization model based, at least in part, on the set of payment transaction data, the simulated authorization model being a replica of an issuer authorization model associated with an issuer server; and
   classify via the simulated authorization model, each enriched synthetic transaction from the subset of feasible fraudulent transaction data as one of fraudulent transaction and non-fraudulent transaction.

13. The server system as claimed in claim 12, wherein the server system is further caused, at least in part, to:
   generate a set of adversarial data based, at least in part, on the set of payment transaction data;
   collate the set of synthetic transaction data and the set of adversarial data to generate a set of new synthetic transaction data;
   access the set of historical card velocity features from the transaction database;
   collate the set of new synthetic transaction data and the set of historical card velocity features to generate a set of new enriched synthetic transaction data;
   extract via the classifier, a subset of new feasible fraudulent transaction data from the set of new enriched synthetic transaction data;
   generate the simulated authorization model based, at least in part, on the set of payment transaction data, the simulated authorization model being the replica of the issuer authorization model associated with the issuer server, and
   classify via the simulated authorization model, each new enriched synthetic transaction from the subset of new feasible fraudulent transaction data as one of fraudulent transaction and non-fraudulent transaction.

14. The server system as claimed in claim 13, wherein the set of adversarial data is generated by attacking the simulated authorization model using a black-box attack, the set of adversarial data indicating negative perturbations in the set of payment transaction data.

15. The server system as claimed in claim 13, wherein the black-box attack is at least one of Zeroth-order optimization, HopskipJump, Boundary attack, and GenAttack.

16. The server system as claimed in claim 12, wherein the server system is further caused, at least in part, to:
  generate a vulnerability report based, at least in part, on determining if one or more enriched synthetic transactions from one of the subset of feasible fraudulent transaction data and the subset of new feasible fraudulent transaction data is classified as a non-fraudulent transaction, the vulnerability report indicating one or more vulnerabilities in the simulated authorization model; and
  transmit the vulnerability report to the issuer server.

17. The server system as claimed in claim 12, wherein the set of historical card velocity features comprises information related to a number of transactions performed using the card over a given period of time, a number of times the card was used by a particular merchant, an average card spend, a transaction amount for each card.

18. A non-transitory computer-readable storage medium comprising computer-executable instructions that, when executed by at least a processor of a server system, cause the server system to perform a method comprising:
  accessing a set of payment transaction data from a transaction database, the set of payment transaction data comprising a subset of fraudulent transaction data and a subset of non-fraudulent transaction data;
  generating via a machine learning model, a set of synthetic transaction data based, at least in part, on the subset of fraudulent transaction data;
  accessing a set of historical card velocity features from the transaction database;
  collating the set of synthetic transaction data and the set of historical card velocity features to generate a set of enriched synthetic transaction data;
  extracting via a classifier, a subset of feasible fraudulent transaction data from the set of enriched synthetic transaction data;
  generating a simulated authorization model based, at least in part, on the set of payment transaction data, the simulated authorization model being a replica of an issuer authorization model associated with an issuer server; and
  classifying via the simulated authorization model, each enriched synthetic transaction from the subset of feasible fraudulent transaction data one of fraudulent transaction and non-fraudulent transaction.

19. The non-transitory computer-readable storage medium as claimed in claim 18, wherein the method further comprises:
  generating a set of adversarial data based, at least in part, on the set of payment transaction data;
  collating the set of synthetic transaction data and the set of adversarial data to generate a set of new synthetic transaction data;
  accessing the set of historical card velocity features from the transaction database;
  collating, by the server system, the set of new synthetic transaction data and the set of historical card velocity features to generate a set of new enriched synthetic transaction data;
  extracting via the classifier, a subset of new feasible fraudulent transaction data from the set of new enriched synthetic transaction data;
  generating a simulated authorization model based, at least in part, on the set of payment transaction data, the simulated authorization model being a replica of an issuer authorization model associated with an issuer server; and
  classifying via the simulated authorization model, each new enriched synthetic transaction from the subset of new feasible fraudulent transaction data as one of fraudulent transaction and non-fraudulent transaction.

20. The non-transitory computer-readable storage medium as claimed in claim 18, wherein the method further comprises:
  generating a vulnerability report based, at least in part, on determining if one or more enriched synthetic transactions from one of the subset of feasible fraudulent transaction data and the subset of new feasible fraudulent transaction data is classified as a non-fraudulent transaction, the vulnerability report indicating one or more vulnerabilities in the simulated authorization model; and
  transmitting the vulnerability report to the issuer server.

* * * * *